(12) United States Patent
Sankaran et al.

(10) Patent No.: US 11,972,183 B2
(45) Date of Patent: *Apr. 30, 2024

(54) REDUCED PHYSICS WELL PRODUCTION MONITORING

(71) Applicant: Xecta Intelligent Production Services, Houston, TX (US)

(72) Inventors: Sathish Sankaran, Spring, TX (US); Diego Molinari, Houston, TX (US); Wenyue Sun, Houston, TX (US); Sanjay Paranji, Spring, TX (US)

(73) Assignee: Xecta Intelligent Production Services, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,493

(22) Filed: Nov. 2, 2022

(65) Prior Publication Data

US 2023/0059014 A1  Feb. 23, 2023

Related U.S. Application Data

(63) Continuation of application No. 17/566,329, filed on Dec. 30, 2021, now Pat. No. 11,514,216.

(Continued)

(51) Int. Cl.
*E21B 41/00* (2006.01)
*E21B 47/003* (2012.01)
(Continued)

(52) U.S. Cl.
CPC .............. *G06F 30/28* (2020.01); *E21B 41/00* (2013.01); *E21B 47/003* (2020.05); *E21B 47/06* (2013.01);
(Continued)

(58) Field of Classification Search
CPC ...... G06F 30/28; G06F 2113/08; E21B 41/00; E21B 47/003; E21B 47/06;
(Continued)

(56) References Cited

U.S. PATENT DOCUMENTS 11,514,216 B1 * 11/2022 Sankaran ................ G06F 30/28
2007/0112547 A1   5/2007 Ghorayeb et al.
(Continued)

OTHER PUBLICATIONS

Martin, John C. "Simplified equations of flow in gas drive reservoirs and the theoretical foundation of multiphase pressure buildup analyses." Transactions of the AIME 216.01 (1959): 321-323.

(Continued)

*Primary Examiner* — Brad Harcourt
(74) *Attorney, Agent, or Firm* — Baker Botts L.L.P.

(57) ABSTRACT

Fluid flow dynamics modeling methods and system are provided. In some embodiments, such methods include determining a bottomhole pressure for the unconventional reservoir based, at least in part, on a tubing head pressure for one or more wells penetrating at least a portion of the unconventional reservoir, one or more fluid properties of a fluid in the unconventional reservoir, and a well production volume for the one or more wells; determining a Productivity Index (PI) for the unconventional reservoir, based, at least in part, on the one or more fluid properties and measured well data for the one or more wells, wherein the measured well data includes a well production rate and a well flowing pressure; and determining a fluid depletion of the unconventional reservoir based, at least in part, on the bottomhole pressure and the PI.

6 Claims, 18 Drawing Sheets

Related U.S. Application Data

(60) Provisional application No. 63/224,260, filed on Jul. 21, 2021.

(51) Int. Cl.
    *E21B 47/06*     (2012.01)
    *E21B 49/08*     (2006.01)
    *G06F 30/28*     (2020.01)
    *E21B 43/12*     (2006.01)
    *E21B 43/267*     (2006.01)
    *G06F 113/08*     (2020.01)

(52) U.S. Cl.
CPC ........ *E21B 49/0875* (2020.05); *E21B 43/121* (2013.01); *E21B 43/267* (2013.01); *E21B 2200/20* (2020.05); *G06F 2113/08* (2020.01)

(58) Field of Classification Search
CPC .. E21B 49/0875; E21B 43/121; E21B 43/267; E21B 2200/20; E21B 43/00
See application file for complete search history.

(56) References Cited

U.S. PATENT DOCUMENTS

| | | | |
|---|---|---|---|
| 2012/0273221 A1* | 11/2012 | Robayo | E21B 43/124 166/372 |
| 2013/0035920 A1 | 2/2013 | Al-Shammari | |
| 2015/0354341 A1 | 12/2015 | Irani et al. | |
| 2016/0010444 A1 | 1/2016 | AlQahtani et al. | |
| 2022/0259972 A1* | 8/2022 | Shaker | E21B 49/087 |

OTHER PUBLICATIONS

Vogel, J. V. "Inflow performance relationships for solution-gas drive wells." Journal of petroleum technology 20.01 (1968): 83-92.

Rayes, Daniel George, et al. "Two-phase compressibility factors for retrograde gases." SPE formation evaluation 7.01 (1992): 87-92.

Ik, Dilhan, et al. "Exponential vs. hyperbolic decline in tight gas sands: understanding the origin and implications for reserve estimates using Arps' decline curves." SPE annual technical conference and exhibition. OnePetro, 2008.

Ozkan, Erdal, et al. "Comparison of fractured-horizontal-well performance in tight sand and shale reservoirs." SPE Reservoir Evaluation & Engineering 14.02 (2011): 248-259.

Duong, Anh N. "An unconventional rate decline approach for tight and fracture-dominated gas wells." Canadian unconventional resources and international petroleum conference. OnePetro, 2010.

Nobakht, Morteza, and Christopher R. Clarkson. "A new analytical method for analyzing linear flow in tight/shale gas reservoirs: constant-flowing-pressure boundary condition." SPE Reservoir Evaluation & Engineering 15.03 (2012): 370-384.

Clark, Aaron James, Larry Wayne Lake, and Tadeusz Wiktor Patzek. "Production forecasting with logistic growth models." SPE annual technical conference and exhibition. OnePetro, 2011.

Zhang, Yanbin, et al. "Fast-marching methods for complex grids and anisotropic permeabilities: Application to unconventional reservoirs." SPE Reservoir Simulation Symposium. OnePetro, 2013.

Chen, Chih, and Rajagopal Raghavan. "On the liquid-flow analog to evaluate gas wells producing in shales." SPE Reservoir Evaluation & Engineering 16.02 (2013): 209-215.

Uzun, Ilkay, Basak Kurtoglu, and Hossein Kazemi. "Multiphase rate-transient analysis in unconventional reservoirs: theory and application." SPE Reservoir Evaluation & Engineering 19.04 (2016): 553-566.

King, Michael J., Zhenzhen Wang, and Akhil Datta-Gupta. "Asymptotic solutions of the diffusivity equation and their applications." SPE Europec featured at 78th EAGE Conference and Exhibition. OnePetro, 2016.

Xue, Xu, et al. "Reservoir and fracture-flow characterization using novel diagnostic plots." SPE Journal 24.03 (2019): 1248-1269.

Atadeger, Aykut, et al. "Comparison of the Methods for Analyzing Rate-and Pressure-Transient Data from Multistage Hydraulically Fractured Unconventional Gas Reservoirs." SPE Reservoir Evaluation & Engineering 23.02 (2020): 627-647.

Carlsen, Mathias Lia, et al. "Fluid Sampling in Tight Unconventionals." SPE Annual Technical Conference and Exhibition. OnePetro, 2019.

Molinari, Diego, et al. "A Hybrid Data and Physics Modeling Approach Towards Unconventional Well Performance Analysis." SPE Annual Technical Conference and Exhibition. OnePetro, 2019.

Arps, Jan J. "Analysis of decline curves." Transactions of the AIME 160.01 (1945): 228-247.

Bohacs, K. M., et al. "The spectrum of fine-grained reservoirs from 'shale gas' to 'shale oil'/tight liquids: essential attributes, key controls, practical characterization." IPTC 2013: International Petroleum Technology Conference. European Association of Geoscientists & Engineers, 2013.

Valko, P. P., and W. D. McCain Jr. "Reservoir oil bubblepoint pressures revisited; solution gas-oil ratios and surface gas specific gravities." Journal of Petroleum Science and Engineering 37.3-4 (2003): 153-169.

Molinari, Diego, and Sathish Sankaran. "Merging Physics and Data-Driven Methods for Field-Wide Bottomhole Pressure Estimation in Unconventional Wells." Unconventional Resources Technology Conference, Jul. 26-28, 2021. Unconventional Resources Technology Conference (URTeC), 2021.

Yang, Changdong, et al. "A novel approach for production transient analysis of shale gas/oil reservoirs." Unconventional Resources Technology Conference, San Antonio, Texas, Jul. 20-22, 2015. Society of Exploration Geophysicists, American Association of Petroleum Geologists, Society of Petroleum Engineers, 2015.

Wicker, Joe, et al. "Improving Well Designs and Completion Strategies Utilizing Multivariate Analysis." Unconventional Resources Technology Conference, Austin, Texas, Jul. 24-26, 2017. Society of Exploration Geophysicists, American Association of Petroleum Geologists, Society of Petroleum Engineers, 2017.

Molinari, Diego, et al. "Implementing an Integrated Production Surveillance and Optimization System in an Unconventional Field." Unconventional Resources Technology Conference, Denver, Colorado, Jul. 22-24, 2019. Unconventional Resources Technology Conference (URTeC); Society of Exploration Geophysicists, 2019.

Younus, Bilal, et al. "Field-Wide Equation of State Model Development." SPE/AAPG/SEG Unconventional Resources Technology Conference. OnePetro, 2019.

Burton, Mac, et al. "A Data-Driven Modeling Methodology to Support Unconventional Reservoir Development Decisions: Application to the Stack Play in Oklahoma." Unconventional Resources Technology Conference, Denver, Colorado, Jul. 22-24, 2019. Unconventional Resources Technology Conference (URTeC); Society of Exploration Geophysicists, 2019.

Pradhan, Yogashri. "Observed Gas-Oil Ratio Trends in Liquids Rich Shale Reservoirs." Unconventional Resources Technology Conference, Jul. 20-22, 2020. Unconventional Resources Technology Conference (URTEC), 2020.

Dake, L.P . . . Fundamentals of Reservoir Engineering. Netherlands, Elsevier Science, 1978 (ISBN: 978-0-444-41830-2).

Perrine, R. L. "Analysis of Pressure-buildup Curves." Drilling and Production Practice, American Petroleum Institute, 1957, 31 pages.

\* cited by examiner

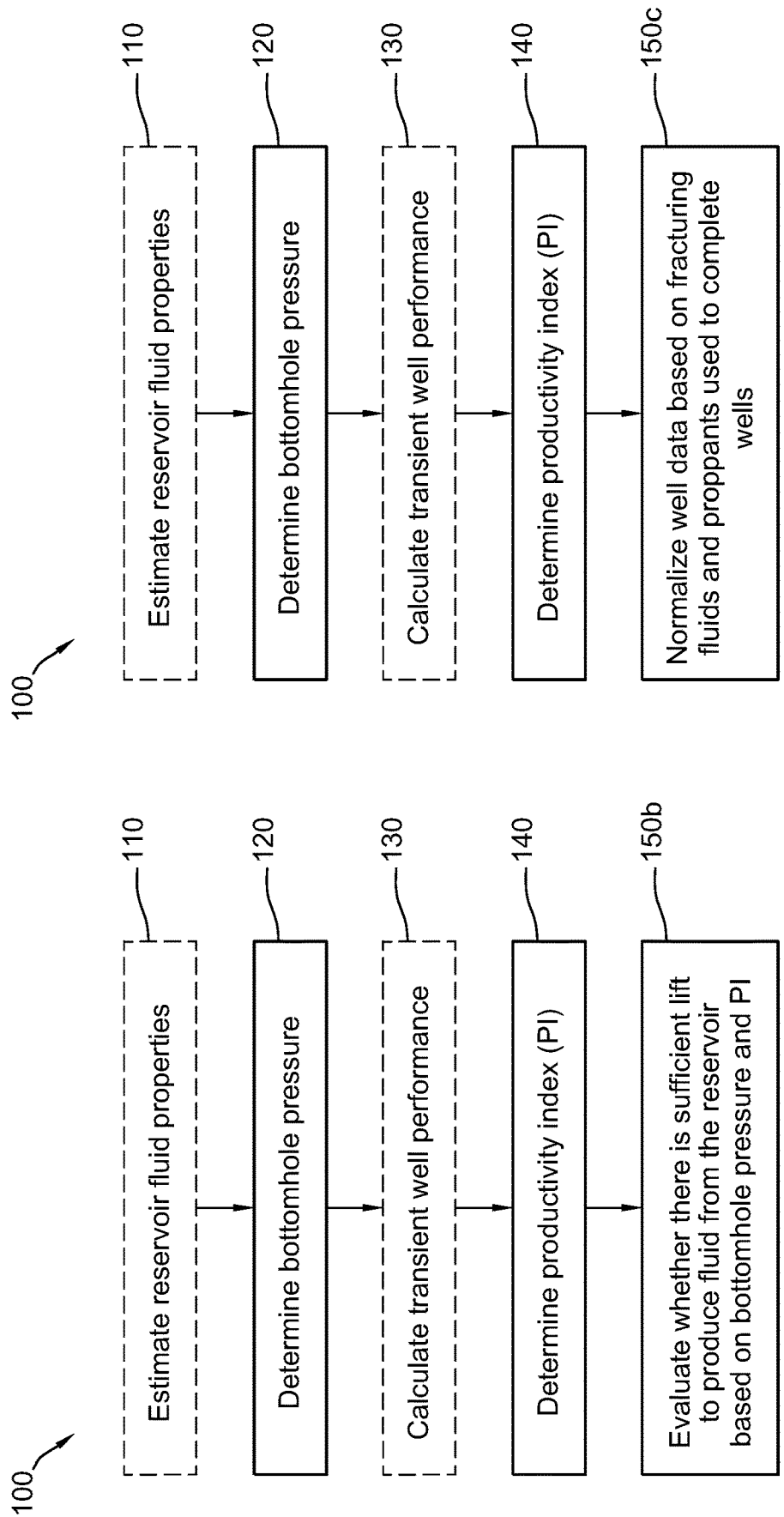

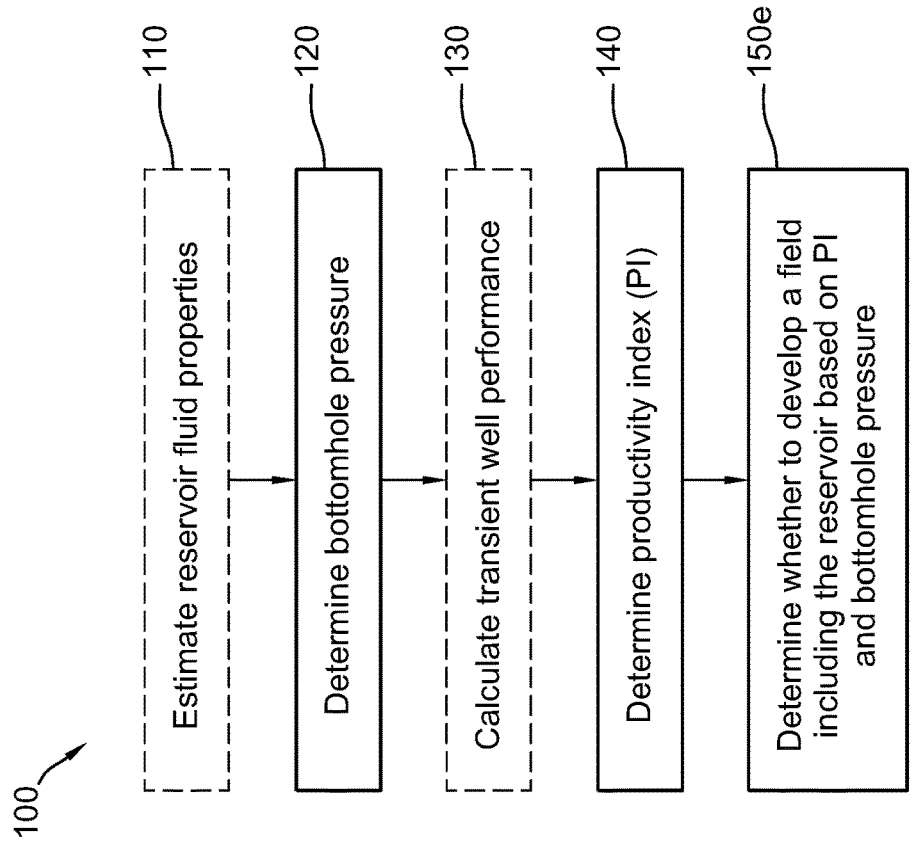

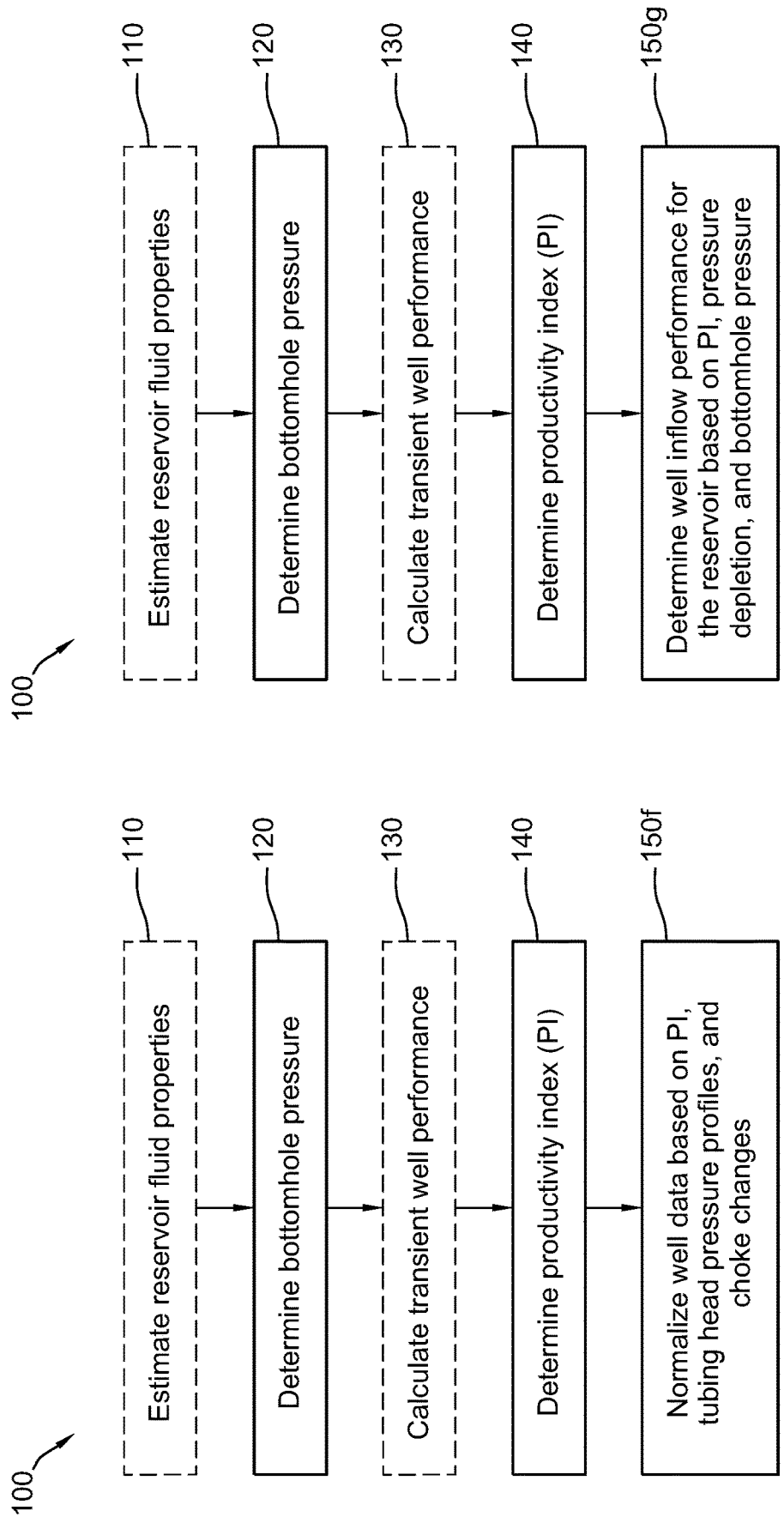

REDUCED PHYSICS WELL PRODUCTION MONITORING

CROSS-REFERENCE TO RELATED APPLICATION

This application is a continuation of U.S. patent application Ser. No. 17/566,329 filed Dec. 30, 2021 entitled "Reduced Physics Well Production Monitoring", which claims the benefit of U.S. Provisional Application No. 63/224,260 filed Jul. 21, 2021 entitled "Reduced Physics Well Production Monitoring" by Sathish Sankaran, Wenyue Sun, Diego Molinari, and Sanjay Paranji.

BACKGROUND

The development of unconventional reservoirs has triggered a reimagination of reservoir engineering models and methodologies. The completion of horizontal wells with multi-stage fracturing has enabled the commercial production of hydrocarbon resources in ultra-low permeability rock. It is helpful to understand well performance across the whole life of the wells to efficiently and economically develop unconventional reservoirs. Identification of the key drivers and production behaviors is important to generate robust production forecasting and to enable proper field development planning and production optimization.

Traditional well performance analysis and modeling methodologies proved insufficient to properly represent the production behavior in unconventional wells. These are characterized by rapid production decline and long periods of transient flow generated by a complex fractured system in very low permeability. For the past two decades, researchers and practitioners have focused on trying to understand rate and pressure transient behaviors of unconventional reservoirs under different production strategies.

Decline curve analysis ("DCA") has been adopted as one of the most popular production forecasting methods. The original production decline model has been modified for unconventional reservoirs by allowing b-factors larger than 1 to represent prolonged transient flow and using multiple segments to represent various flow regimes. Additionally, novel decline curve models have emerged to represent more complex and sophisticated production decline trends such as modified hyperbolic, power law. Decline curve analysis methods are fast, repeatable, and easy to implement and maintain, and they remain a favorite method for reserves booking and production planning. However, many existing DCA methods implicitly assume constant operating conditions and cannot fully capture changes in the well production such as choke changes, artificial lift installations and change in the artificial lift operational parameters. Furthermore, many wells are surface constrained, and often do not exhibit a discernable production decline. In such wells, the DCA method often cannot be applied without the use of surrogate-type curves with little fidelity to the actual production data. Finally, DCA models are single-phase and empirical, and do not capture fundamental physics, such as the expected gas-oil ratio increase on oil systems as the solution gas is liberated when pressure declines below saturation pressure.

Analytical methods such as rate transient analysis ("RTA") have been also adopted as fast and simplified models which capture some physics, including rock and fluid properties and the transient flow regimes, with the premise of generating a more representative production forecast. However, these models are difficult to generalize for all wells, as they require knowledge of rock properties (such as porosity and permeability in both matrix and "enhanced" stimulated zones) and completion attributes (number of fractures, fracture conductivity and geometry such as half-length, fracture height etc.) that cannot be accurately defined and measured, introducing significant input uncertainty in the models. With so many modeling parameters, solutions are non-unique and difficult to constrain. Often, a pragmatic model implementation involves assuming many of these input parameters through rules of thumb and engineering judgment, which adds significant bias to the models as many of these inputs cannot be empirically validated.

Some models may include more complex physics, such as irregular fracture geometries, heterogeneous reservoir properties, stress-dependent rock properties (geomechanical effects), compositional PVT, adsorption, Knudsen diffusion, PVT suppression, and the like. While numerical models may provide mechanistic understanding of relevant phenomena, there is no consensus on the correct physics to properly model unconventional reservoirs in a particular setting for routine business processes such as forecasting and production optimization. Each company and researcher may use a different set of assumptions and modeling principles, resulting in various modeling philosophies such as using planar fractures in a homogeneous field, dual porosity systems, discrete fracture networks, dynamic stimulated rock volumes, and the like. In practice, diverse modeling approaches produce a wide and often diverging set of answers. Also, numerical models are computationally intensive, taking time to build and history match, which requires expensive and extensive data collection, often not available for most wells. In field applications with hundreds or thousands of wells, existing simulation models are unable to keep up with the pace of development and cannot scale to cover every well, so as a compromise they are typically applied only in a few representative wells. Thus, any conclusion will be affected by the sample bias depending on the selected history-matched wells, while not all the data is being leveraged.

Data-driven models such as statistical learning techniques and machine learning have been implemented as alternatives to the traditional domain-specific physics-based reservoir models. Given sufficient training data, these models can capture complex relationships and predict hydrocarbon production from a variety of data inputs, including rock-fluid properties, completion design parameters and operational factors. These models can be very powerful for various applications in descriptive, predictive, and prescriptive analytics, but have their own inherent drawbacks. First, sufficient training data is required to properly capture meaningful correlations, both in quantity (large number of wells) and quality (representing variability in the input ranges). Data-driven models may only be valid within the training data features and ranges, so they tend to be very specific to a given field/basin/sector and not fully generalizable. Most training data available does not include pressure and, inherently, the data set is biased toward the specific operating mode of the well, which is often ignored. Additionally, data-driven models are not guaranteed to provide a robust extrapolation for more general conditions as they do not incorporate any physics acting as a constraint. For the most complex machine learning models, there is also the problem of interpretability, as the models are often perceived as a black box, difficult to explain and audit, which may limit their adoption in a business setting.

It is desirable to have a robust and scalable method for quantifying well productivity, which can be applied in a practical manner to all wells, overcoming the limitations of decline curve analysis and conventional analytical and numerical models.

BRIEF DESCRIPTION OF THE DRAWINGS

FIGS. 17-23 are process flow diagrams illustrating methods for modeling fluid flow dynamics in a reservoir according to certain embodiments of the present disclosure.

Figure 1:
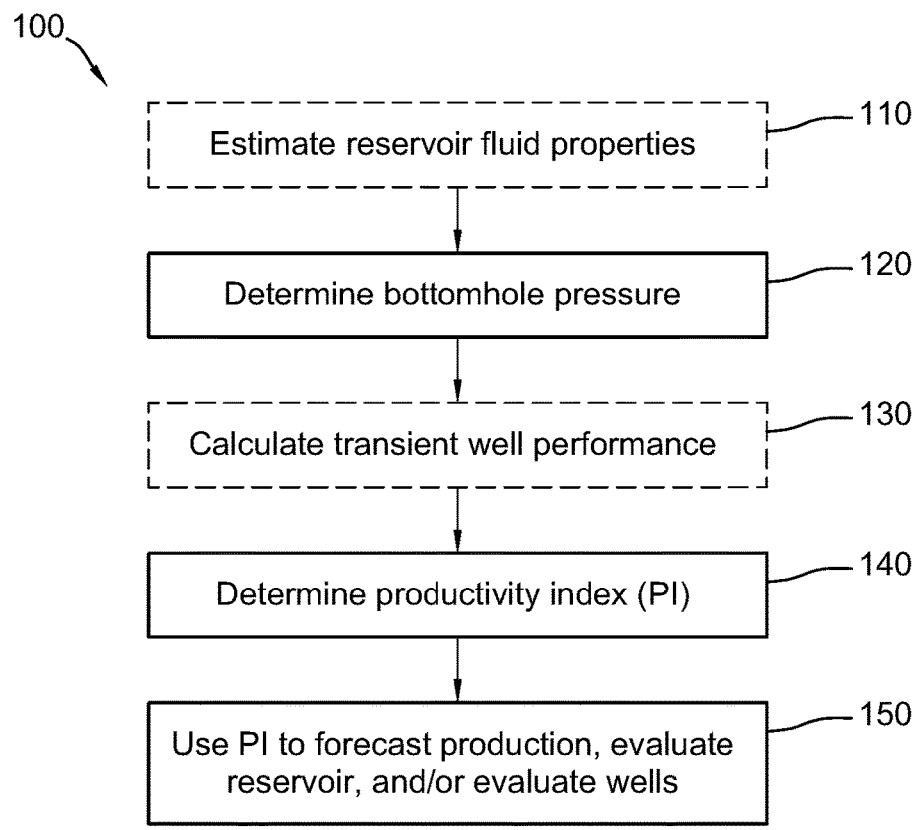
FIG. 1 is a process flow diagram illustrating a method for modeling fluid flow dynamics in a reservoir according to certain embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for modeling fluid flow dynamics in fluid systems. In some embodiments, the modeling may include a reduced-physics method for modeling unconventional well and reservoir performance.

More specifically, the present disclosure provides methods of modeling fluid depletion from an unconventional reservoir, including: determining a bottomhole pressure for the unconventional reservoir based, at least in part, on a tubing head pressure for one or more wells penetrating at least a portion of the unconventional reservoir, one or more fluid properties of a fluid in the unconventional reservoir, and a well production volume for the one or more wells; determining a transient Productivity Index (PI) for the unconventional reservoir, based, at least in part, on the one or more fluid properties and measured well data for the one or more wells, wherein the measured well data includes a well production rate and a well flowing pressure; and determining a fluid depletion of the unconventional reservoir based, at least in part, on the bottomhole pressure and the transient PI. In certain embodiments, the methods of the present disclosure may include determining, based, at least in part, on the transient productivity index and the bottomhole pressure, whether there is sufficient lift to produce fluid from the unconventional reservoir.

In some embodiments, the present disclosure provides methods of modeling fluid depletion from an unconventional reservoir, including: for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) for the unconventional reservoir, based, at least in part, on the one or more fluid properties and measured well data for the two or more wells, wherein the measured well data includes one or more of a well production rate and a well flowing pressure; and normalizing the measured well data from the two or more wells based, at least in part, on fracturing fluids and proppants used to complete the two or more wells. In certain embodiments, the methods include identifying at least one well of the two or more wells experiencing production interference from another well based, at least in part, on the PI. In some embodiments, the methods may include whether to develop a field including the unconventional reservoir based, at least in part, on the PI and the bottomhole pressure. In certain embodiments, the methods may include normalizing well data from the two or more wells based, at least in part, on the PI, the tubing head pressure, and choke changes for the two or more wells.

In certain embodiments, the present disclosure provide methods of modeling fluid depletion from an unconventional reservoir including: for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) and a pressure depletion for the unconventional reservoir; and calculating a well inflow performance for the reservoir based, at least in part, on the PI, the pressure depletion, and the bottomhole pressure.

Among the many potential advantages to the methods and systems of the present disclosure, only some of which are alluded to herein, the methods and systems of the present disclosure may provide improved methods and systems for modeling fluid flow dynamics in fluid systems. In certain embodiments, the methods of the present disclosure may provide fast, robust, repeatable, and scalable methods to model well performance in unconventional reservoirs, able to capture every well, and combining the strengths of data-driven methods (e.g., speed, data-centricity and flexibility) and physics-based models (e.g., robust extrapolation, generalization and interpretability). In certain embodiments, the methods of the present disclosure may provide a hybrid method that is data-centric but rooted in physics-based principles and captures the dynamic evolution of the system by estimating a productivity index. In some embodiments, by incorporating pressure in the analysis, the method of the present disclosure may eliminate the limitations of rate-time methods by accounting for changing operating conditions. The productivity index (PI) is representative of transient well performance and is a key indicator of the well potential which normalizes operational impacts. For example, in certain embodiments, the methods of the present disclosure may normalize production for surface effects and changing operating conditions, and quantify the depletion effect.

In certain embodiments, the PI (e.g., transient PI) may provide an improved indicator for well performance analysis and production forecasting relative to conventional indicators. In some embodiments, a PI-based forecasting method may provide a robust and sustainable method to incorporate pressure into multiphase rate forecasting.

In certain embodiments, the methods of the present disclosure may use only routinely available and measured field data and does not make any assumptions about reservoir homogeneity, flow regimes or production mechanisms. In certain embodiments, the methods of the present disclosure provide a more robust way to predict future production, with better accuracy when compared with existing models (e.g., decline curve analysis). For example, in certain embodiments, the proposed approach provides better definition for long-term gas forecasting and natively captures PI degradation due to depletion and multiphase effects, resulting in an analytical production forecast which is "fluid-aware". In certain embodiments, the methods of the present disclosure feature a reduced-physics model that uses data that is routinely measured for most wells (e.g., production rates, flowing pressure, and/or fluid properties).

In some embodiments, the methods of the present disclosure may estimate the dynamic drainage volume of a reservoir under transient flow and calculate the average reservoir pressure decline during the well primary depletion. In certain embodiments, for multiphase flow in the reservoir at conditions below saturation pressure, dependence of fluid properties with pressure are handled, representing both liquid and gas fluid types. The resulting drainage volume (and associated instantaneous recovery ratio) may be correlated with rock quality and completion attributes and may be used as a metric to rank and compare wells. In certain embodiments, a productivity index may be directly estimated and used as a key metric representing the true well production potential, by normalizing changing operating conditions. In some embodiments, the methods of the present disclosure may provide a multiphase production forecast, incorporating the effects of pressure, volume, and temperature (PVT) changes and pressure depletion. Additionally, in some embodiments, the well inflow performance relationship (IPR) may be estimated for any time step, capturing subsurface well deliverability, and enabling well production optimization. As used herein, "well inflow performance" refers to the relationship between inflow rate and pressure at bottomhole or at a suitable node that controls the amounts of fluid entering the well from the reservoir. For liquid reservoirs, when the operating node pressure is above saturation (i.e., bubblepoint pressure), then the PI may describe a linear relationship between liquid rate and drawdown (i.e., difference between average reservoir pressure and node pressure). Adjustments may need to be made for below saturation pressure based on a Vogel equation or equivalent. Similarly, for gas reservoirs, pseudo-pressure or square of pressure may be used instead of pressure.

In certain embodiments, the methods of the present disclosure may be used to estimate a well productivity index (PI) for one or more wells or for an unconventional reservoir. In some embodiments, the well or reservoir PI may be a transient PI. In certain embodiments, PI may be estimated at a field scale across more than one well to understand unconventional well performance for a reservoir. This PI may then be used in a variety of applications, including well forecasting, artificial lift planning, production optimization, field development planning, and analyzing well performance across one or more wells. In certain embodiments, the methods of the present disclosure are applicable to a wide range of fluid systems (incompressible, slightly compressible, and compressible), while considering depletion below the saturation pressure. For example, the methods of the present disclosure may be used to model and analyze gas reservoirs, saturated oil reservoirs (compressible fluids), unsaturated reservoirs, and the like. In addition, the methods of the present disclosure may incorporate the effects of variable total compressibility and pressure-dependent PVT properties.

The method of the present disclosure combines reduced-physics and data-driven techniques using a series of steps to characterize well and/or reservoir properties and performance. In certain embodiments, the methods of the present disclosure may include the workflow 100 shown in FIG. 1 to apply material balance through a succession of pseudo-steady states on the drainage volume evolution of a closed system to approximate transient well and reservoir performance.

In certain embodiments, in step 110 of workflow 100, one or more fluid properties (e.g., PVT properties) of fluids in the wells and/or reservoir may be estimated. In certain embodiments, step 110 may be optional. In step 120, bottomhole pressure for a well or unconventional reservoir may be determined based, at least in part, on a tubing head pressure of one or more wells penetrating at least a portion of the unconventional reservoir, the one or more fluid properties of a fluid in the unconventional reservoir, and a well production volume for one or more wells penetrating at least a portion of the unconventional reservoir.

In step 130, the transient well performance of a well and/or reservoir is calculated from surface measurements in order to capture downhole flowing conditions, wherein the measured data includes one or more of well production rate, well flowing pressure, and/or the one or more fluid properties. In certain embodiments, step 130 may include using an optimization routine to estimate the transient well performance based, at least in part, on the dynamic drainage volume, and to calculate an average reservoir depletion. In some embodiments, drainage volume and reservoir pressure depletion may be determined or estimated based, at least in part, on the bottomhole pressure determined in step 120. In certain embodiments, the measured well data for one or more wells may be normalized based, at least in part, on one or more well parameters or properties (e.g., the fracturing fluids used to complete the well, the proppants used to complete the two or more wells, completion effectiveness, choke changes, tubing head pressure profiles, and the like). In certain embodiments, step 130 may be optional. In step 140, a productivity index is determined based, at least in part, on the transient well performance for the one or more wells. productivity index (PI). In step 150, PI is used as a base variable to perform production forecasting. In certain embodiments, production forecasting 150 is performed using PI and expected future operating conditions. In certain embodiments, production forecasting 150 may be used to estimate the inflow performance relationship (IPR) curves for one or more wells to capture well deliverability. This workflow 100 and embodiments thereof are discussed further below. In some embodiments, the method of the present disclosure may be used to determine one or more indicators or metrics (e.g., PI, drainage volume, instantaneous recovery ratio, average reservoir pressure), which may be used to normalize and compare well performance. Additionally, in certain embodiments, average reservoir pressure and PI may be determined and used to represent well deliverability (as a dynamic IPR curve) at various field conditions (past and future) that can be used for drawdown management, artificial lift planning and optimization.

In step 110, one or more fluid properties (e.g., PVT properties) of fluids in the wells and/or reservoir may be estimated. In some embodiments, the one or more fluid properties include one or more properties of the fluid as a function of pressure and temperature, as it flows through the reservoir, well and surface equipment. In certain embodiments, the one or more fluid properties may include, but are not limited to oil specific gravity, gas specific gravity, water specific gravity, solution gas/oil ratio (GOR), saturation pressure, critical point, formation volume factor, compressibility, and any combination thereof. For example, in certain embodiments, the one or more fluid properties may be determined based, at least in part, on lab-based measurements, basin-wide equation of state, early production data, flowback analysis, or any combination thereof. In some embodiments, one or more fluid properties is determined from a representative sample of the fluid in the reservoir or well.

In certain embodiments, one or more fluid properties (e.g., PVT properties) may be determined for a specific well or at least a portion of a reservoir. In other embodiments, one or more fluid properties may be determined for two or more wells, or across an entire reservoir. In such embodiments, for example, a field-wide equation of state (EOS) model may be used to provide fluid characterization of one or more fluid properties (e.g., the phase and volume behavior of a fluid system). The EOS model may then be used to estimate the fluid properties at any well location based on its corresponding fluid composition, reservoir pressure, and/or temperature. In some embodiments, fluid composition may be known from samples taken across the reservoir and/or wells.

In some embodiments, one or more fluid properties (e.g., PVT properties) for fluids in wells and/or reservoirs may be determined based, at least in part, on measurements taken on flowback fluids from one or more wells. The flowback data for a specific well may be used to reflect early time flow conditions which are representative of the original reservoir conditions before depletion is experienced. In certain embodiments, the most representative period during flowback is selected by detecting an interval with steady production gas-oil ratio (GOR). Specific gravities for each fluid (e.g., oil, gas and water) may be sampled in the same stable period. In some embodiments, corrections may be applied to sampled data to obtain corrected GORs, saturation pressures, or specific gravities. For example, a non-parametric non-linear regression technique trained on a database of PVT samples may be used to correct such data. In other embodiments, a PVT black-oil correlations may be used. In other embodiments, production data from produced fluids may be used to determine one or more fluid properties for fluids in wells and/or reservoirs.

In certain embodiments, a corrected fluid GOR may be used to properly represent the reservoir conditions, as the production GOR is dependent on the separation process, namely, separator pressure and temperature. In embodiments where separator conditions are not known, either representative field conditions can be used, or a general correction can be applied. In some embodiments, the saturation pressure may be calculated based, at least in part, on reservoir or well temperature. In certain embodiments, once one or more basic fluid PVT properties are known (e.g., oil/gas/water specific gravities and solution GOR), the full PVT properties of the fluid can be represented through a black-oil correlation. A person of skill in the art, with the benefit of this disclosure, would understand which black-oil correlations would be suitable for a given reservoir, well, and application.

In step 120, bottomhole pressure for a well or unconventional reservoir may be determined. Generating a reliable estimate of BHP may aid in further characterizing the dynamic production behavior of a system. For example, in certain embodiments, it may be helpful to know the flowing pressure at the downhole "node" in the well (at the depth of reservoir inflow) to properly represent the well production potential. In some unconventional wells, however, only the tubing head pressure or wellhead pressure (measured at tubing and/or annulus) may be routinely measured, and may not have permanent downhole gauges for the whole production life. In such embodiments, bottomhole pressure may be calculated from surface data. For example, in certain embodiments, bottomhole pressure may be determined based, at least in part, on a tubing head pressure of one or more wells penetrating at least a portion of the unconventional reservoir, the one or more fluid properties of a fluid in the unconventional reservoir, and a well production volume for the one or more wells.

For example, in certain embodiments, bottomhole pressure (BHP) may be estimated from surface pressure and rate measurements by applying steady-state multiphase flow correlations to capture the pressure losses in the wellbore. As shown in Equation 1, the overall pressure losses may be expressed as the sum of the following pressure drop components—static, frictional, acceleration, and any head added by artificial lift (e.g., ESP, rod pump etc.). For gas lifted wells, the effect of gas injection in lightening the density of the liquid column may also be modeled.

$$\Delta P = \Delta P_{static} + \Delta P_{friction} + \Delta P_{acceleration} - \Delta P_{lift} \quad (1)$$

Figure 2:
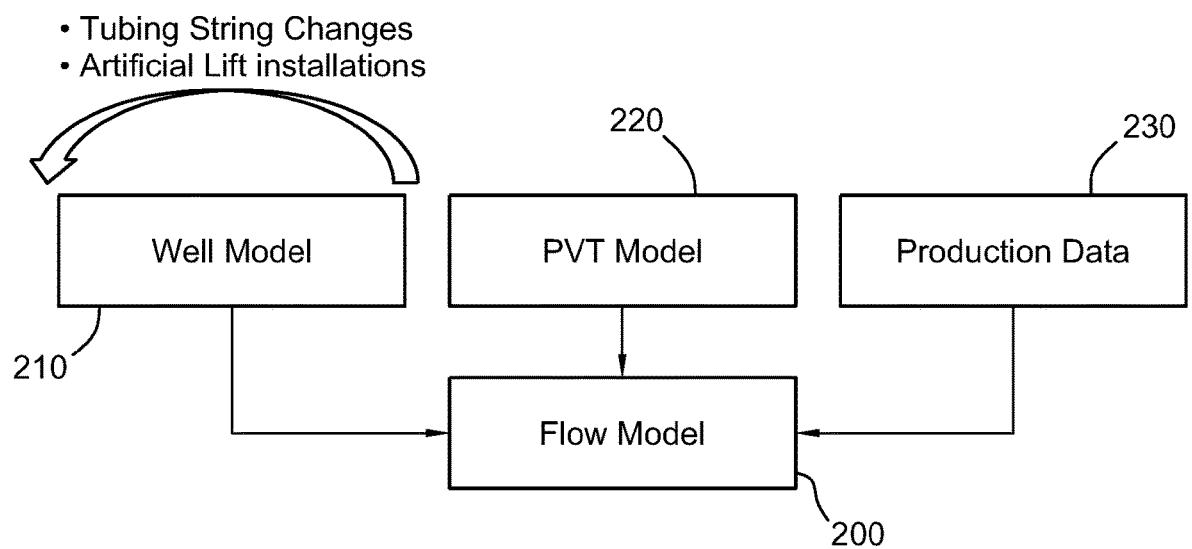
FIG. 2 is a schematic diagram of a fluid flow model according to certain embodiments of the present disclosure.

With reference to FIG. 2, in certain embodiments, a flow model 200 may be used to calculate bottomhole pressure may include a wellbore model 210 based on wellbore parameters or data, a PVT model 220 (e.g., a model or correlation discussed above), and/or production data 230. In certain embodiments, the wellbore model 220 may be updated continuously or periodically to account for changes in wellbore configuration and downhole equipment, such as tubing string changes and artificial lift installations. In certain embodiments, the flow model 200 is used to calculate bottomhole pressure over time. In certain embodiments, the flow model 200 is configured to calculate BHP for all periods in the life of the well. In some embodiments, BHP may be continuously calculated in real-time to provide automatic production surveillance and monitoring.

In step 130, production data of a well and/or reservoir may be calculated from surface measurements (e.g., measured well data) in order to capture transient downhole flowing conditions and well performance. In some embodiments, transient well performance is characterized in unconventional wells using well production rates, PVT data or correlations, and flowing bottomhole pressures obtained as described in the prior steps. In certain embodiments, measured data used to determine downhole flowing conditions may include, but are not limited to well production rate, well flowing pressure, one or more fluid properties, and any combination thereof. In certain embodiments, well performance, downhole flowing conditions, or well production data of a well and/or reservoir may also be determined based on PVT properties of a fluid (e.g., as determined by PVT models/correlations). In certain embodiments, determining transient well performance may include an optimization routine and an iterative process. In some embodiments, determining transient well performance may be determined based, at least in part, on non-linear pressure-dependent PVT properties. Determining transient well performance may generate outputs including, but not limited to transient estimates of drainage volume, transient average reservoir pressure, and any combination thereof.

In certain embodiments, transient well performance may be determined with a methodology that combines the concept of diffusive-time-of-flight (DTOF) with material balance theory. In one embodiment, the methodology includes an optimization routine which simultaneously solves the DTOF and material balance methods through an iterative process. Equation 2 shows an asymptotic equation to the diffusivity equation in heterogeneous porous media.

$$\varphi(\vec{x})\mu c_t \frac{\partial p(\vec{x}, t)}{\partial t} = \nabla \cdot \left[\vec{k}(\vec{x}) \cdot \nabla p(\vec{x}, t)\right] \quad (2)$$

The diffusive time of flight $\tau(\vec{x})$ is physically associated with the peak propagation of a pressure pulse for an impulse source. The 3D diffusivity equation can be reduced to a 1D diffusivity equation, by assuming that the pressure gradients are aligned with the time of flight $\tau(\vec{x})$ gradients (i.e., $p(\vec{x},t) \approx p(\tau(\vec{x}),t)$).

In certain embodiments, a method of determining transient well performance may begin with the drainage volume expression shown in Equation 3, where the drainage volume is calculated using the pressure and rate data in the absence of a well and reservoir model.

$$V_d \approx \frac{1}{c_t \frac{d}{dt_e}(RNP)} \quad (3)$$

where: $V_d$ is drainage volume, $c_t$ is total compressibility, RNP is rate-normalized pressure, and $t_e$ is material balance time.

The calculated drainage volume in Equation 3 represents the contacted reservoir pore volume due to the propagation of the pressure front at any given time step in the reservoir. The calculated drainage volume tracks the DTOF contour of an irregular geometry due to the draining of a lumped fracture system and unstimulated matrix. This rate-normalized pressure (RNP) approximation represents the production behavior that would be observed if the well were produced at a constant reference rate. In Equation 3, material balance time and rate-normalized pressure are calculated as follows:

$$t_e = \frac{Q}{q} \quad (4)$$

$$RNP = \frac{p_i - p_{wf}}{q} \quad (5)$$

where: Q is cumulative production volume, q is instantaneous production rate, $p_i$ is initial reservoir pressure, and $P_{wf}$ is flowing bottomhole pressure.

Multiphase flow (oil, gas, and water) in an unconventional reservoir may be approximated, where a total equivalent rate is estimated to recombine all phases into an equivalent single composite phase at reservoir conditions. The total equivalent rate defined in Equation 6 is used to estimate material balance time in Equation 4 and pressure normalized rate in Equation 5, which are applied in Equation 3 to determine drainage volume.

$$q_{te} = q_o B_o + q_w B_w + (q_g - q_o R_s) B_g \quad (6)$$

where: $q_{te}$ is total equivalent rate, $q_o$ is oil rate, $q_w$ is water rate, $q_g$ is gas rate, $R_s$ is solution gas-oil ratio at a pressure of interest, $B_o$ is oil formation volume factor at a pressure of interest, $B_w$ is water formation volume factor at a pressure of interest, and $B_g$ is gas formation volume factor at a pressure of interest.

The total compressibility of the system, which is also required for Equation 3, may be estimated from the initial fluid saturations and sampled properties at a given reference pressure. Equation 7 assumes that the reservoir is only saturated with oil and water, without the presence of free gas, which is a representative assumption for most liquids-rich unconventional resources.

$$c_t = c_w S_{wi} + c_o (1 - S_{wi}) + c_f \quad (7)$$

where: $c_t$ is total compressibility at pressure of interest, $c_o$ is oil compressibility at pressure of interest, $c_w$ is water compressibility at pressure of interest, $c_f$ is formation compressibility, and $S_{wi}$ is initial water saturation.

Figure 3:
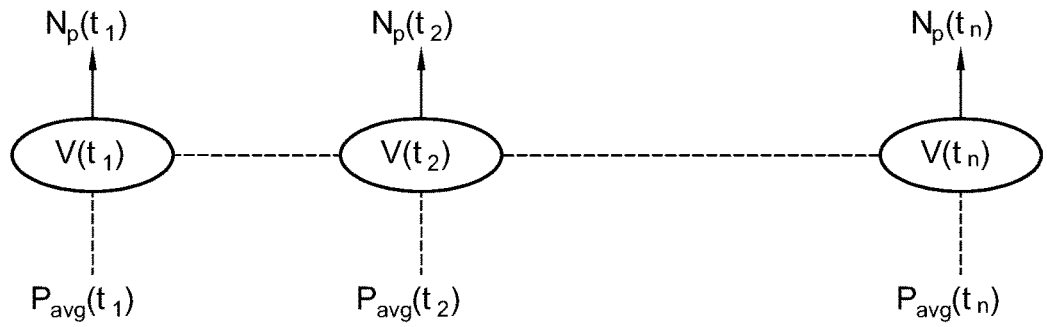
FIG. 3 is an illustration of material balance applied to a succession of time steps with increasing drainage volumes according to certain embodiments of the present disclosure.

Once transient drainage volume is determined (e.g., by the method above), in certain embodiments, material balance may be continuously applied for each time step to estimate the pressure depletion in the system. Material balance is generally valid only during steady-state or pseudo-steady-state conditions, when the well drains a fixed volume (represented as a tank) and all reservoir boundaries have been contacted. In certain embodiments, however, boundary-dominated conditions may not be reached in unconventional wells. For example, in some unconventional wells, even when the well contacts all fractures, the low permeability matrix is still being incrementally contacted. In such embodiments, transient flow (where the drainage volume is dynamic and continuously increasing) can be approximated as "snapshots" or a succession of instantaneous pseudo-steady states, as shown in FIG. 3. The drainage volume (e.g., the drainage volume calculated in Equation 3) may define the size of the "tank" (V) in each time step. Applying material balance to drainage volume allows the estimation of the loss of energy in the contacted drainage volume, manifested as reservoir depletion. As shown in FIG. 3, cumulative oil production ($N_p$) may be calculated at each time step.

In certain embodiments, the general material balance expression of Equation 8 may be used. Equation 8 represents the following fundamental effects.

(Liquid expansion)+(Liberated gas expansion)+ (Change in pore volume due to connate water/ residual oil expansion and pore volume reduction)=(Underground withdrawal) (8)

Each term of Equation 8 may be derived to obtain a representative material balance expression for an oil-producing unconventional well in the absence of free gas cap and aquifer in the reservoir. The liquid expansion term is defined in Equation 9.

$$N(B_o - B_{oi}) + W(B_w - B_{wi}) \quad (9)$$

where N is total oil volume originally in place, W is total water volume originally in place, $B_o$ is oil formation volume factor at a pressure of interest, $B_{oi}$ is oil formation volume factor at initial reservoir pressure, $B_w$ is water formation volume factor at a pressure of interest, and $B_{wi}$ is water formation volume factor at initial reservoir pressure.

The liberated gas expansion term of Equation 8 may be defined by Equation 10.

$$N(R_{si} - R_s) B_g \quad (10)$$

where: N is total oil volume originally in place, $R_{si}$ is initial solution gas-oil ratio, $R_s$ is solution gas-oil ratio at a pressure of interest, and $B_g$ is gas formation volume factor at a pressure of interest.

The term in Equation (8) defined by change in pore volume due to the expansion of connate water and residual oil, and pore volume reduction, may be determined as shown in Equation 11.

$$dPV = -dV_w - dV_o + dV_F = -(c_w V_e + c_o V_o + c_F V_F) \Delta p \quad (11)$$

where oil, water and pore volumes are defined as $$V_o = \frac{(NB_{oi} + WB_{wi}) S_{or}}{1 - S_{wc} - S_{or}} \quad (12)$$

$$V_w = \frac{(NB_{oi} + WB_{wi}) S_{wc}}{1 - S_{wc} - S_{or}} \quad (13)$$

$$V_F = \frac{NB_{oi} + WB_{wi}}{1 - S_{wc} - S_{or}} \quad (14)$$

By combining Equations 12, 13 and 14 into Equation 11, we obtain Equation 15.

$$-dPV = (NB_{oi} + WB_{wi}) \left( \frac{S_{wc} c_w + S_{or} c_o + c_F}{1 - S_{wc} - S_{or}} \right) \Delta p \quad (15)$$

where: dPV is total change in pore volume, $dV_w$ is expansion in connate water volume, $dV_o$ is expansion in residual oil volume, $dV_F$ is reduction in pore volume due to formation compressibility, $S_{wc}$ is connate water saturation, $S_{or}$ is residual oil saturation, $\Delta p$ is reduction in reservoir pressure due to depletion, N is total oil volume originally in place, and W is total water volume originally in place.

The last term in the material balance Equation (8), underground withdrawal, may be obtained from the cumulative produced volumes, calculated as follows.

$$N_p [B_o + (R_p - R_s) B_g] + W_p B_w \quad (16)$$

where: $N_p$ is cumulative oil production, $W_p$ is cumulative water production, $R_p$ is cumulative gas-oil ratio (calculated as cumulative gas divided by cumulative oil), $R_s$ is solution gas-oil ratio at a pressure of interest, $B_o$ is oil formation volume factor at a pressure of interest, $B_g$ is gas formation volume factor at a pressure of interest, and $B_w$ is water formation volume factor at a pressure of interest.

In certain embodiments, a closure relationship for the material balance relating oil (N) and water (W) volumes originally in place may be needed. However, in certain embodiments, only a total drainage volume is determined combining all phases (e.g., Equation 3). In some embodiments, the drainage volume may be split into oil and water components by defining co, the ratio of water to oil in place volumes, as shown in Equation 17. In one or more embodiments, the ratio co may be directly provided as an input, determined from volumetrics, or approximated from PVT and petrophysical properties, as defined in Equation 18.

$$\omega = \frac{WB_{wi}}{NB_{oi}} \quad (17)$$

$$\omega \approx \frac{(S_w - S_{wc}) B_{wi}}{(1 - S_w - S_{or}) B_{oi}} \quad (18)$$

where $S_w$ is water saturation.

In certain embodiments, Equations 9, 10, 15, 16, and 18 may be combined with Equation 8 to determine a final material balance expression, Equation 19. Equation 19 may be solved for the pressure change representing reservoir depletion.

$$\Delta p = \left( \frac{1 - S_{wc} - S_{or}}{S_{wc} c_w + S_{or} c_o + c_F} \right) \left\{ \frac{N_p [B_o + (R_p - R_s) B_g] + W_p B_w}{V_d} - \right. \quad (19)$$

-continued $$\left(\frac{1}{1+\omega}\right)\left[\frac{(B_o - B_{oi}) + (R_{si} - R_s)B_g}{B_{oi}} + \frac{\omega(B_w - B_{wi})}{B_{wi}}\right]\right\}$$

The delta-pressure in Equation 19 represents the reservoir pressure drop from initial pressure as shown in Equation 20.

$$\Delta p = p_i - p_{avg} \quad (20)$$

where $p_i$ is initial reservoir pressure and $p_{avg}$ is average reservoir pressure.

In some embodiments, the average reservoir pressure represents the volumetric-averaged pressure in the contacted drainage volume at any instantaneous time, and may approximate the depletion in the reservoir due to production. Equation 19 may be re-arranged to solve for drainage volume ($V_d$), as shown in Equation 21.

$$V_d = \frac{N_p[B_o + (R_p - R_s)B_g] + W_p B_w}{\frac{(B_o - B_{oi}) + (R_{si} - R_s)B_g}{(1+\omega)B_{oi}} + \left(\frac{\omega}{1+\omega}\right)\frac{(B_w - B_{wi})}{B_{wi}} + \left(\frac{S_{wc}c_w + S_{or}c_o + c_F}{1 - S_{wc} - S_{or}}\right)\Delta p} \quad (21)$$

Figure 4:
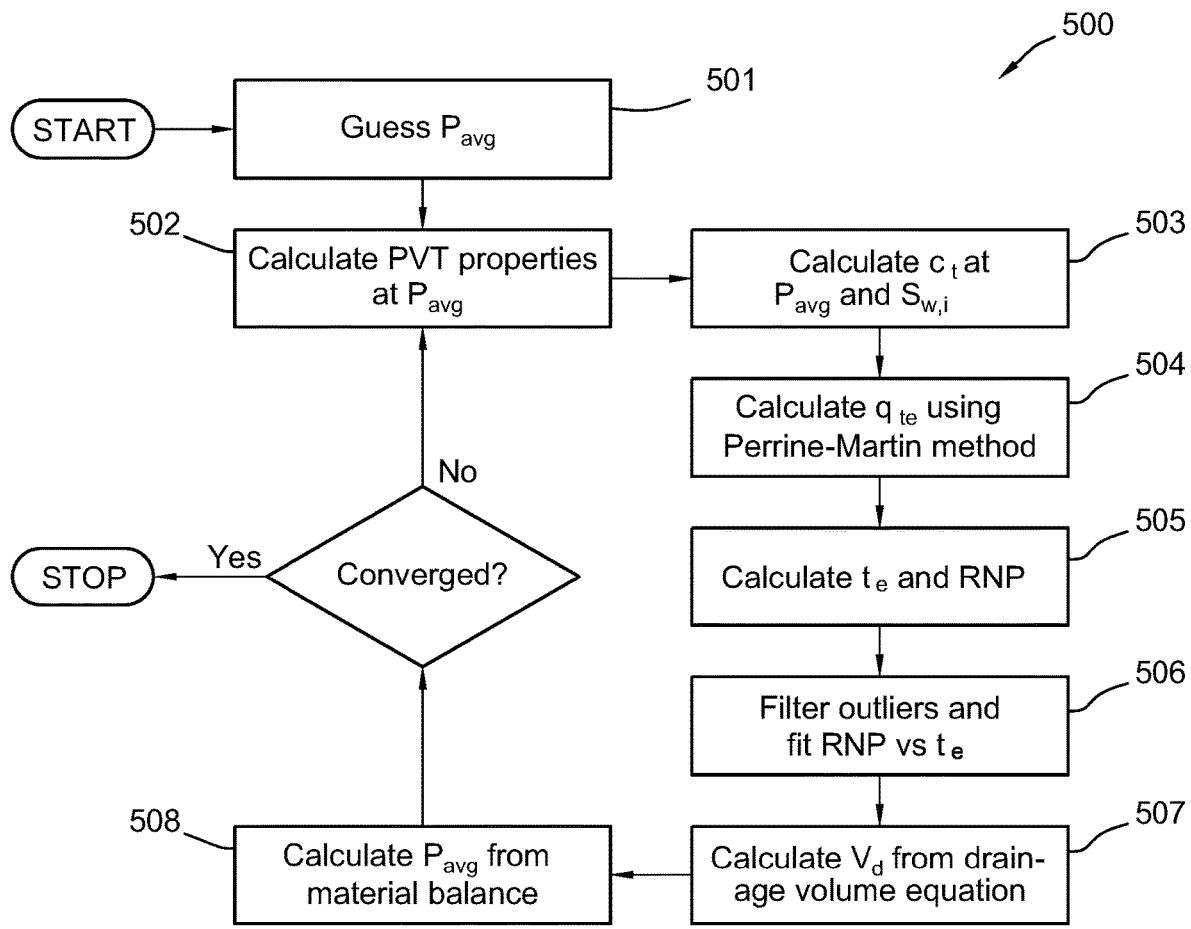
FIG. 4 is a process flow diagram illustrating a method for modeling drainage volume and average reservoir pressure depletion according to certain embodiments of the present disclosure.

These equations and steps represent embodiments by which the methods of the present disclosure may be used to capture transient well performance by estimating drainage volume and reservoir pressure depletion. In some embodiments, these methods could be performed iteratively in an optimization process. FIG. 4 illustrates one embodiment of an iterative optimization process 500 that could be used to estimate drainage volume and reservoir pressure depletion according to certain embodiments of the present disclosure. The process of FIG. 4 incorporates pressure-dependent PVT properties (e.g., formation volume factor, compressibility, solution GOR). In step 501, an average reservoir pressure ($P_{avg}$) is assumed or guessed for all evaluated time steps, as a function of cumulative liquid production. The reservoir pressure trend may start from initial reservoir pressure and be monotonically decreasing. In step 502, all required PVT properties (e.g., $B_o$, $B_g$, $B_w$, $R_s$, $c_o$, $c_w$) are calculated at each input pressure value. The PVT properties may be calculated using any PVT-dependent method of the present disclosure. In step 503, total compressibility ($c_t$) is estimated for all given pressures using initial water saturation (e.g., using Equation (7)), assuming that the average water saturation does not change in time. In step 504, the total equivalent rate ($q_{te}$) may be calculated for all evaluated pressures (e.g., using Equation (6)). In step 505, material balance time ($t_e$) and rate-normalized pressure (RNP) may be determined (e.g., using Equations (4) and (5)). In step 506, filters may be applied to the data to eliminate outliers and fit RNP vs $t_e$ with a hyperbolic equation. In step 507, drainage volume ($V_d$) may be calculated (e.g., using Equation (3)) with the smoothed RNP vs $t_e$ trend. Using the values calculated in the prior steps, step 508 may include estimate average reservoir pressure (e.g., using Equations (19) and (20)). In step 508, the required co parameter can either be provided as a direct input or estimated with Equation (18). If steps 501-508 do not converge on a solution, they may be repeated for a different $P_{avg}$ until a converged solution is achieved.

In some embodiments, instantaneous recovery ratio (IRR) for a well may be determined based on the transient well performance method described above. As used herein, "IRR" refers to a recovery factor for a well at a given moment in time, given the producing rates and contacted drainage volume. In certain embodiments, IRR may be a useful diagnostic metric that estimates completion effectiveness.

$$IRR = \frac{Q_{te}}{V_d} \quad (22)$$

where: IRR is instantaneous recovery ratio at evaluated time step, $V_d$ is drainage volume at evaluated time step, and $Q_{te}$ is cumulative total equivalent volume (e.g., by Perrine-Martin method) at evaluated time step.

In certain embodiments, the transient well performance may be used to determine a productivity index. In step 140 of FIG. 1, a productivity index (e.g., a transient productivity index) is determined based, at least in part, on measured data for the one or more wells, wherein the measured data includes one or more of well production rate, well flowing pressure, and the one or more fluid properties. In certain embodiments, the measured data is used to determine transient well performance in step 130, which is in turn used to determine the productivity index in step 140. For example, in certain embodiments, an optimization routine may be used to estimate the transient well performance, calculate the dynamic drainage volume, average reservoir depletion and productivity index (PI). As used herein, "productivity index (PI)" may refer to production volumes normalized by the flowing pressures and incorporating the impact of pressure depletion and PVT. In certain embodiments, PI may determined based, at least in part on one or more of the well producing rates, flowing bottomhole pressure, and average reservoir pressure. For conventional reservoirs, PI may be considered as constant under pseudo-steady state flow. In certain embodiments, PI is a transient quantity that is updated at each timestep in a model.

In certain embodiments, the PI is an inherent property of a well or reservoir describing the resistance to flow and defines the relationship between flow rate, average reservoir pressure and well node pressure (e.g., bottomhole pressure). In certain embodiments, PI is a representative metric of well performance and true reservoir inflow potential. For example, PI may allow consistent comparison of wells experiencing different operating conditions, such as different choke openings or artificial lift, mitigating biases often encountered in rate-time based type curves. In certain embodiments, PI normalizes well data based, at least in part, on routine operational changes that may occur (e.g., choke changes) and tubing head pressure profiles into an inherent subsurface property. Also, by representing the relationship between rates and pressure drawdown, PI may be used in certain embodiments for production optimization purposes, to predict current and future production given various operational strategies.

For a given reservoir condition at any time instance, PI may also depend on the actual drawdown and may have a constant magnitude only when flowing pressure is above saturation pressure. When flowing pressure drops below saturation pressure, the gas liberation reduces the overall liquid productivity index due to relative permeability changes. Equations 23, 24, and 25, based on the inflow performance relationship equations, can be solved to define the liquid PI at any given time step, given the pressure conditions.

When both the reservoir and flowing BHP are above saturation pressure (undersaturated), the PI may be defined as a simple linear equation in Equation 23. The terms on the right-hand side vary with time.

$$q_l = PI^*(p_{avg} - p_{wf}) \quad (23)$$

where: $q_l$ is liquid rate, PI is liquid productivity index, $p_{avg}$ is average reservoir pressure, and $P_{wf}$ is flowing bottomhole pressure.

If the reservoir is still undersaturated, but the flowing bottomhole pressure drops below saturation pressure (creating saturated conditions in the near-wellbore region), Equation 24 may be used.

$$q_l = PI^*(p_{avg} - p_{sat}) + \left(\frac{PI^* p_{sat}}{1.8}\right) * \left[1 - 0.2\frac{p_{wf}}{p_{sat}} - 0.8\left(\frac{p_{wf}}{p_{sat}}\right)^2\right] \quad (24)$$

where $P_{sat}$ is saturation pressure.

Finally, when the reservoir is fully saturated (average reservoir pressure has depleted below saturation pressure), the PI is represented as shown in Equation 25.

$$q_l = \left(\frac{PI^* p_{avg}}{1.8}\right) * \left[1 - 0.2\frac{p_{wf}}{p_{avg}} - 0.8\left(\frac{p_{wf}}{p_{avg}}\right)^2\right] \quad (25)$$

In some embodiments, (e.g., in step 150 of FIG. 1), PI may be used as a base variable to perform production forecasting. In certain embodiments, production forecasting 150 is performed using PI and expected future operating conditions. In certain embodiments, the productivity index (PI) may normalize surface effects and account for phase behavior, reducing noise.

Figure 5A:
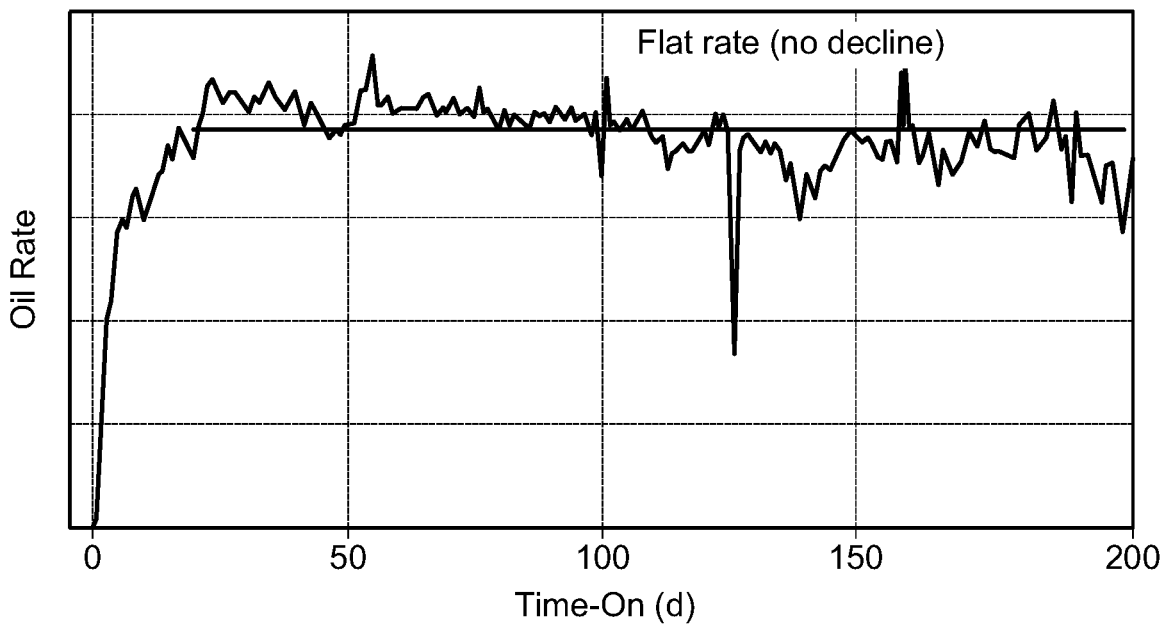
FIG. 5A is a plot of oil rate versus time-on for conventional methods of fluid system analysis.
Figure 5B:
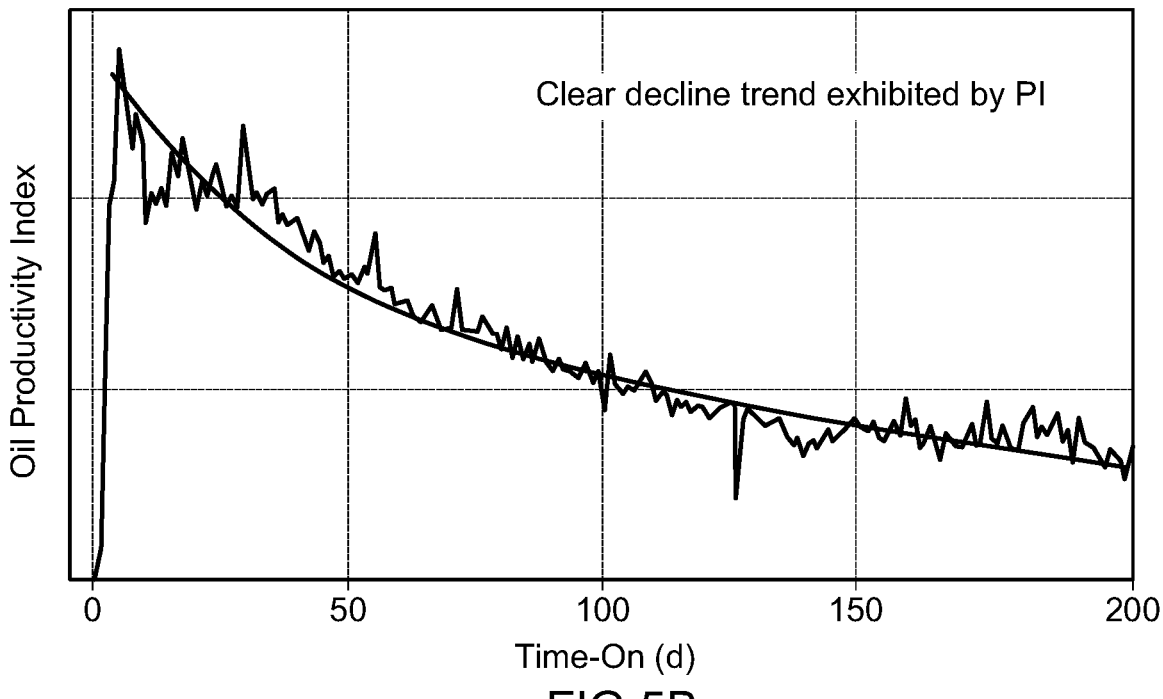
FIG. 5B is a plot of oil productivity index versus time-on according to certain embodiments of the present disclosure.

The use of PI as a forecasting variable may enable forecasting with less data, as a clean production decline trend can be established sooner (as highlighted in FIG. 5B, where a clear production decline trend can be identified at early time even when the rates are flat). In contrast, FIG. 5A shows that conventional analyses such as decline curve analysis (DCA) may incorrectly fail to exhibit any discernable production decline, as illustrated by a sample well in FIG. 5A exhibiting flat production as it experiences facility constraints. Additionally, as there are surface or operational disruptions (e.g., downtime, production constraints, line pressure changes, choke changes, workovers etc.), the rate decline may distorted in certain circumstances.

Figure 6:
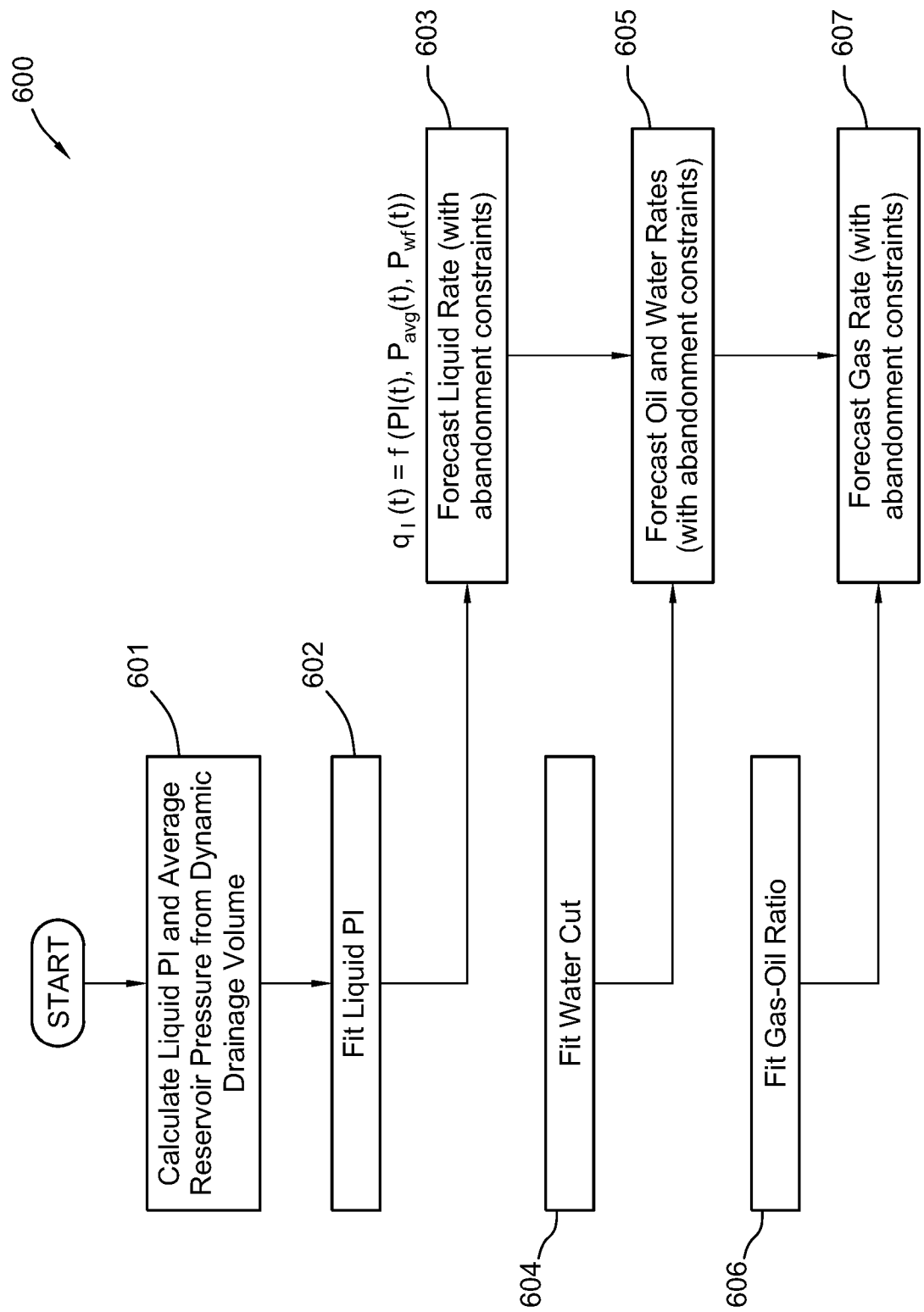
FIG. 6 is a process flow diagram illustrating a method for productivity index-based forecasting according to certain embodiments of the present disclosure.

In certain example embodiments, the PI-based forecasting method may include saturated flow conditions when the flowing BHP and reservoir pressure drop below the bubble point. FIG. 6 shows a process 600 for PI-based forecasting in these conditions. In step 601, the liquid PI and average reservoir pressure ($P_{avg}$) may be determined from dynamic drainage volume. In step 602, the liquid PI trend may be fitted with a modified hyperbolic equation to generate a PI decline model. In certain embodiments, this PI decline model allows extrapolating the PI at future time steps.

In step 603, the PI forecast is converted into a liquid rate profile by combining it with reservoir pressure and BHP forecasts (e.g., using Equations (23), (24) and (25)). The average reservoir pressure is extrapolated as a function of cumulative liquid, following the profile defined through material balance in the prior step. The BHP profile is completely controllable by the operator, as it represents the expected operating conditions under the planned production strategy for each well (e.g., choke schedule and artificial lift installs and operational set points). Hence, the BHP profile can be either a smooth profile or a segmented function representing multiple drawdowns corresponding to the application of various production methods. The BHP profile can even become a sensitivity tool to evaluate the production impact of different operational strategies.

Once the liquid rate forecast is generated as a single-phase forecast 603, a multiphase forecast may also be derived by obtaining the corresponding oil and water rate profiles 605 and obtaining the corresponding gas rate profile 607. This may be achieved in two steps, first modeling the water cut 604, and subsequently modeling the gas-oil ratio (GOR) 606. Both the water cut and GOR models are independent and modular, and various mathematical representations can be used as part of the workflow, tailored to a given field specific conditions. A person skilled in the art, with the benefit of this disclosure, will understand the appropriate models for water cut and GOR that could be used for given conditions. In certain embodiments, water cut may be modeled 604 as a constant trend, a linear trend with a gentle slope, or more complex functional forms.

In certain embodiments, GOR may be forecasted empirically for steps 606 and 607. In certain embodiments, a two-segment power law may be used to model GOR, derived by plotting cumulative oil and cumulative gas in a log-log plot and matching two straight-line models, as illustrated for a sample well in FIG. 7.

$$\log G_p = \log N_p + \log R_{si} \quad (26)$$

where: $G_p$ is cumulative oil production, $N_p$ is cumulative oil production, and $R_{si}$ is the initial solution gas-oil ratio.

In this period, the slope is equal to 1 in the log-log plot and the production GOR may be equal to a constant initial solution GOR, as defined in the PVT model.

$$GOR = R_{si} \quad (27)$$

As the reservoir depletes and reservoir pressure drops below saturation pressure, the well may transition to a second trend, where GOR increases. This is shown as a second linear trend in the log-log plot, with slope larger than 1, representing a power law.

$$\log G_p = m^* \log N_p + c \quad (28)$$

where m is a slope of a second segment and c is an intercept of the second segment.

The gas-oil ratio may be obtained by taking the derivative of Equation (28).

$$GOR = m^* e^c * N_p^{m-1} \quad (29)$$

In certain embodiments, the factors that affect GOR trends include, but are not limited to flowing BHP, saturation pressure, PVT property suppression, pressure-dependent permeability, changes in critical gas saturation, fracture geometry, pore size distributions, gas-oil relative permeability, and any combination thereof. Equations (28) and (29) are data-driven, and they depend on matching the observed GOR increase after an inflection point has been detected. For young wells, when such transition has not been observed, offset wells may be used as analogs to define expected future GOR trends, provided they are producing under similar drawdown conditions.

Figure 7:
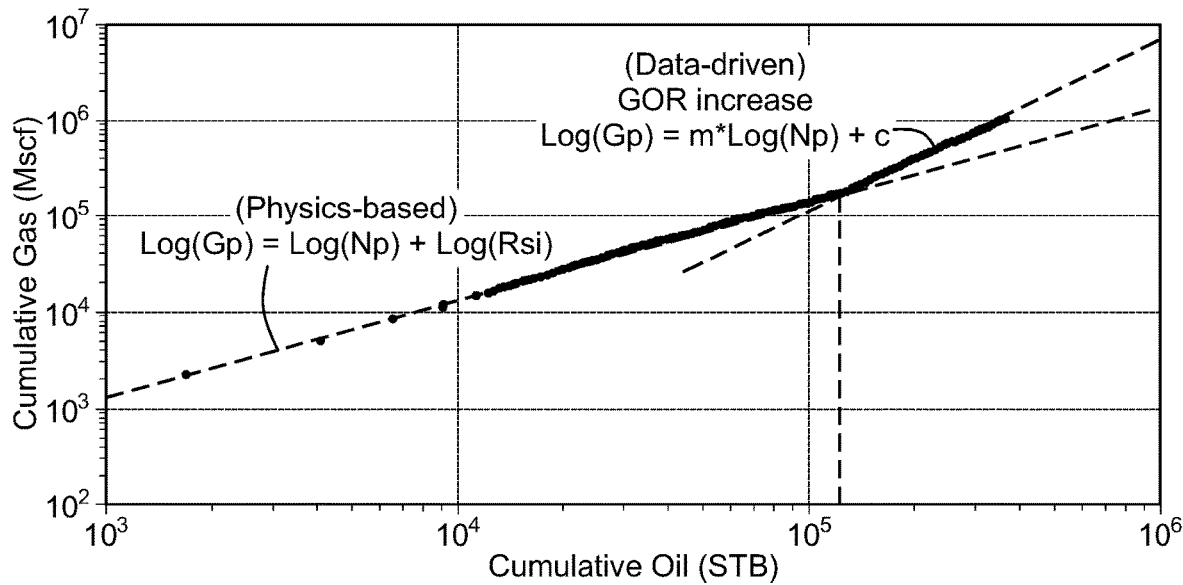
FIG. 7 is a plot of a two-segment gas-oil ratio model according to certain embodiments of the present disclosure.

The two-segment trend illustrated in FIG. 7 has been observed in several wells across various basins, and it is generally adequate to represent most situations. However, when a different GOR model is needed to adapt to specific field trends, such expressions can be implemented without replacing the other parts of the forecasting process 600.

Once both water cut and GOR forecasts are defined, the liquid rate may be decomposed into oil, gas and water profiles (steps 605 and 607), resulting in a multiphase production forecast which can be extended until the specified abandonment conditions.

The PI-based forecasting methods of the present disclosure may include a combination of data-driven methods, as they use empirical models to match and extrapolate PI, water cut and GOR trends, and physics-based methods, as they are PVT-dependent, capture pressure depletion, represent PI reduction at low pressures due to multiphase effects, and can capture production sensitivity at different pressure drawdown strategies.

In certain embodiments, the PI-based forecasting methods of the present disclosure overcome typical limitations of decline curve analysis, as they may be applied to wells with irregular or unstable operating conditions. Also, the methods provide a quantitative basis to run sensitivities and estimate different production profiles under various operational strategies (e.g., representing surface constrained vs unconstrained systems, different choke schedules and various artificial lift timing).

Figure 8:
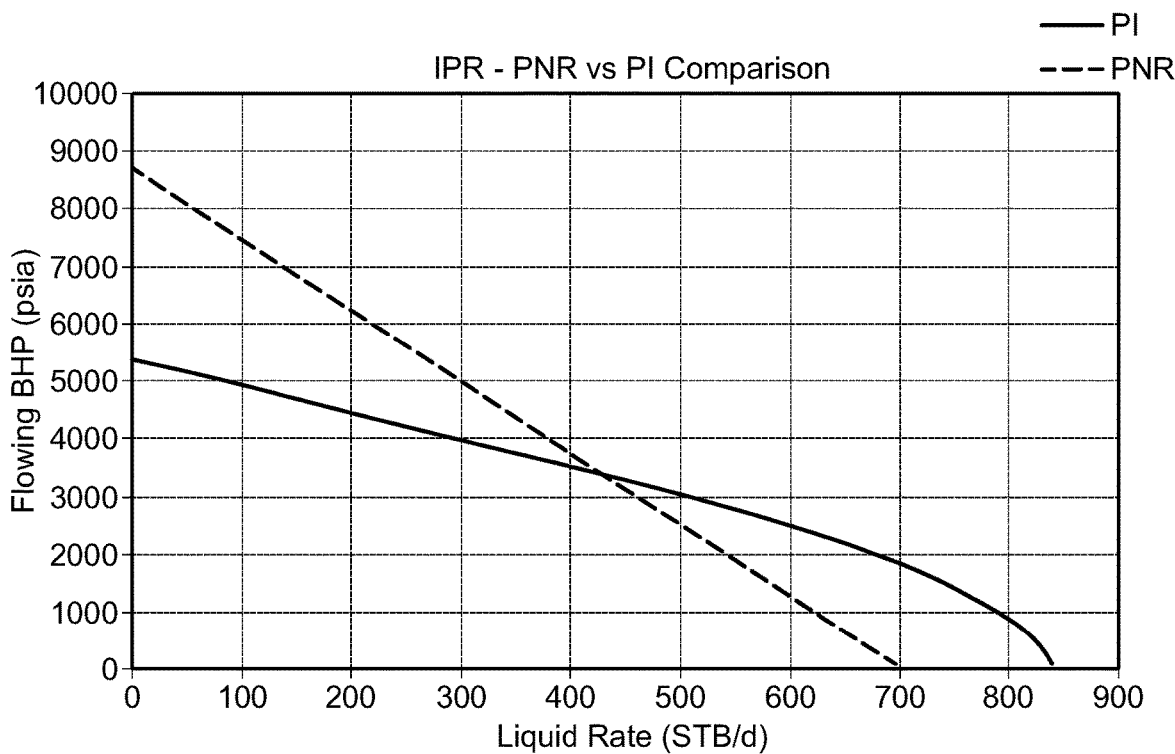
FIG. 8 a plot of forecasted flowing bottomhole pressure versus liquid rate for both a conventional variable pressure-normalized rate (PNR) method and a productivity index method according to certain embodiments of the present disclosure.
Figure 9A:
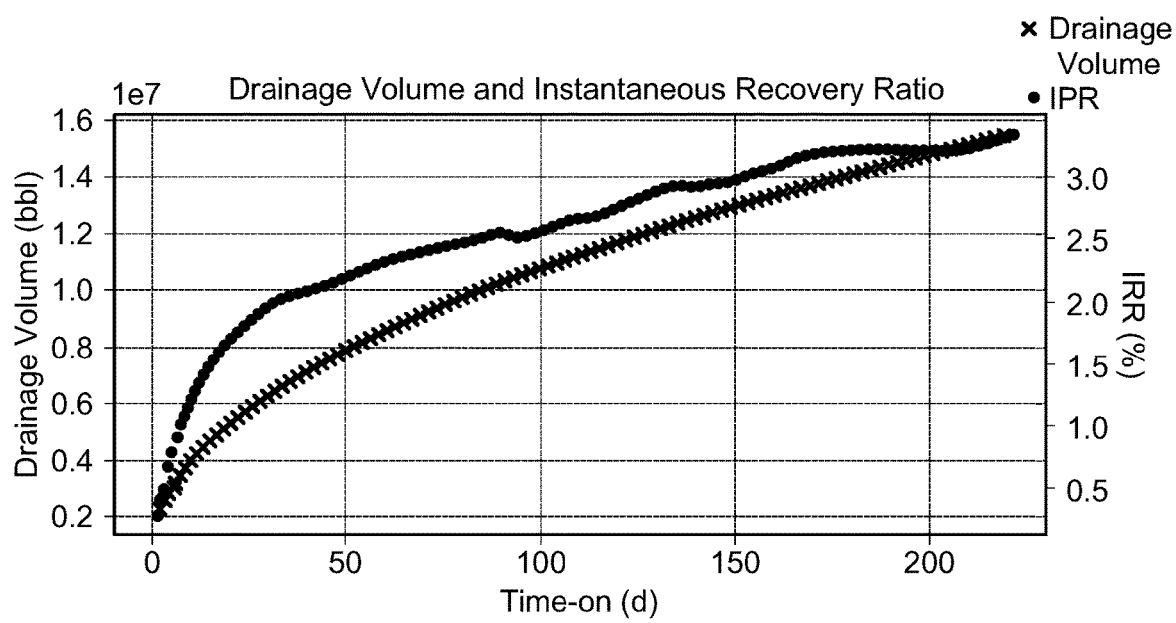
FIG. 9A is a plot of drainage volume and instantaneous recovery ratio for a sample well according to certain embodiments of the present disclosure.
Figure 9B:
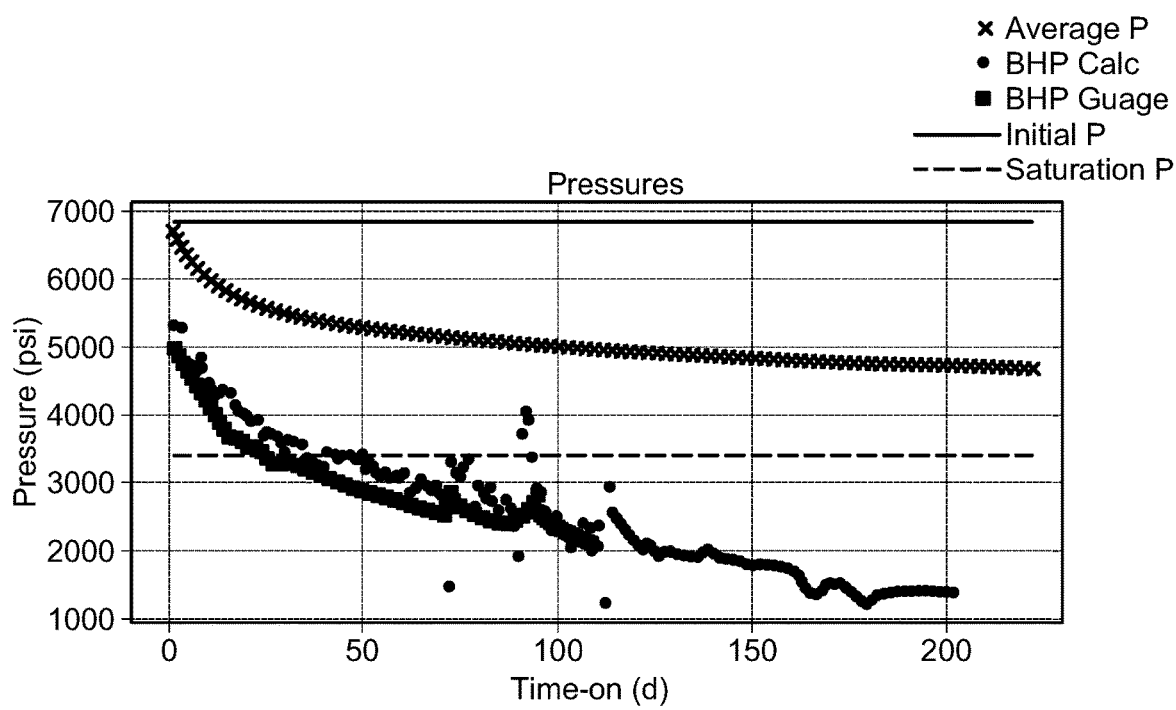
FIG. 9B is a plot of average reservoir pressure and bottomhole pressures for a sample well according to certain embodiments of the present disclosure.
Figure 9C:
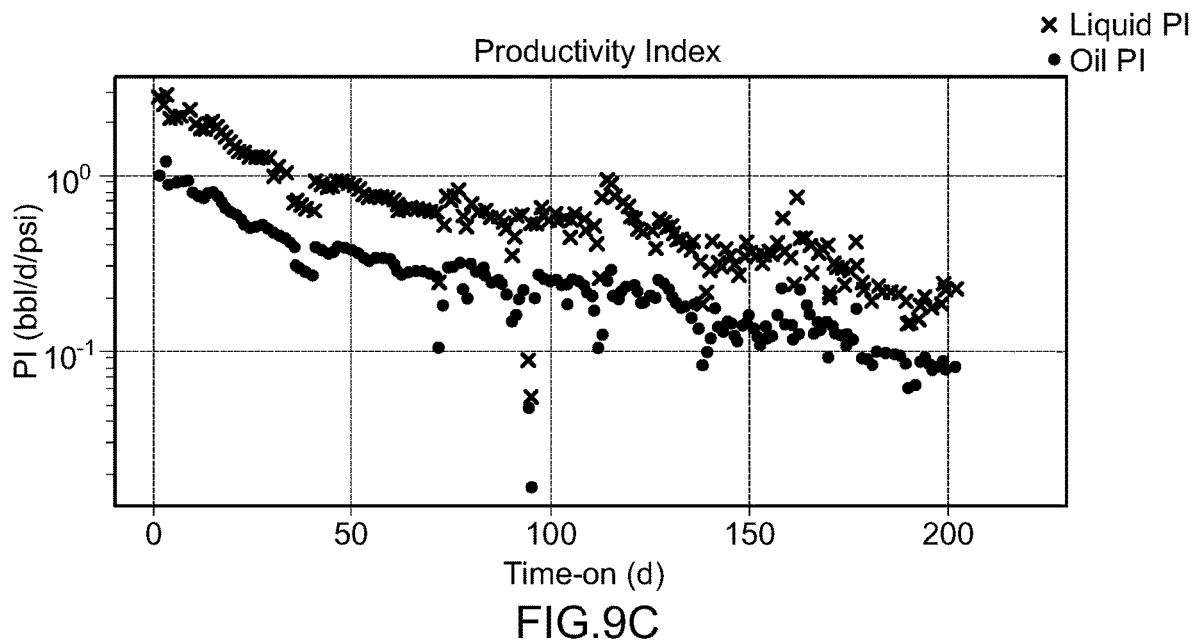
FIG. 9C is a plot of oil productivity index and liquid productivity index for a sample well according to certain embodiments of the present disclosure.
Figure 9D:
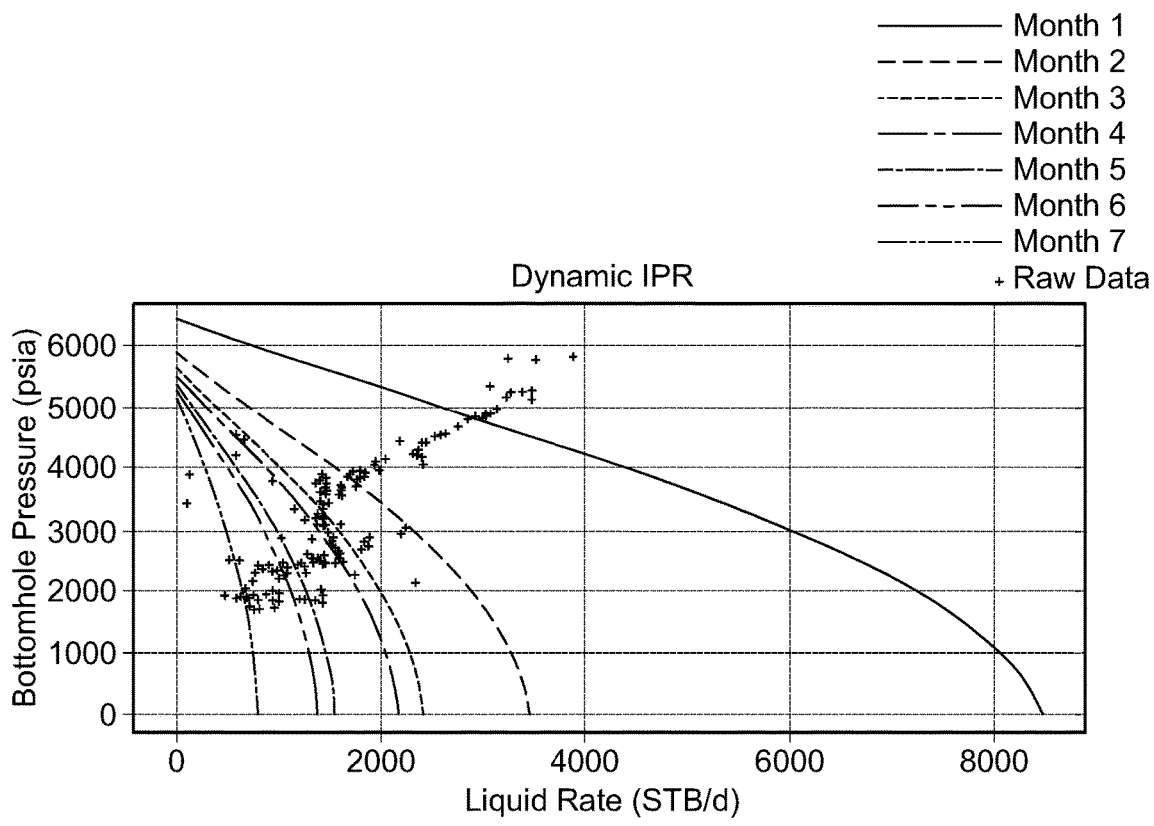
FIG. 9D is a plot of well inflow performance relationship (IPR) for a sample well according to certain embodiments of the present disclosure.

In some embodiments, inflow performance relationship (IPR) curves represent well deliverability at a given reservoir condition, as they display expected liquid production at various pressure drawdowns. FIG. 8 shows a PI inflow performance relationship curve for a PI-based forecasting method. When combined with a vertical lift performance (VLP) curve, representing the well intake, nodal analysis may be performed to determine the well operating point. In certain embodiments, this analysis provides the basis for production optimization, informing artificial lift timing and operational decisions.

IPR curves have not traditionally been used in unconventionals exhibiting prolonged transient flow, since they are only strictly valid for boundary-dominated systems in pseudo-steady state. Example approaches may define IPR curves dynamically using the calculated average reservoir pressure and liquid productivity index. Following the same approach, using Equations (23), (24) and (25), the IPR envelope can be defined at any time step (either historical or forecasted) using transient PI, and form the basis of production optimization analysis. Certain prior methods of forming IPR curves have relied on assuming a simplified version of PI as a simple ratio between rate and the pressure difference between initial reservoir pressure and current BHP known as the variable pressure-normalized rate (PNR), as defined in Equation (30). PNR does not incorporate pressure depletion and incorrectly assumes that the rate always exhibits a linear relationship with drawdown.

$$PNR = \frac{q}{p_i - p_{wf}} \quad (30)$$

Using PNR to represent productivity may, in some instances, lead to inaccurate representations of the well deliverability, as shown in FIG. 8 representing a sample well exhibiting significant pressure depletion and producing at a BHP just above saturation pressure. As shown in FIG. 8, even if the operating point (e.g., current rate and BHP) is captured by both methods, a linear PNR misrepresents the rate potential at different drawdown conditions and provides to less accurate and/or misleading data when used as a production optimization tool, as opposed to the more accurate PI-based IPR.

In some embodiments, the methods of the present disclosure may be applied to gas systems. In certain embodiments, for example, the fluid depletion model includes modeling natural gas (e.g., determining natural gas depletion of an unconventional reservoir). As a starting point, either for dry-gas or gas-condensate cases, appropriate PVT correlations can be used, for example in the case of gas condensate where the specific gravity is estimated from both gas and liquid specific gravities, considering the separator conditions.

In order to apply the DTOF method from Equation (3) to gas systems, the rate-normalized pressure may be expressed in terms of pseudo-pressures.

$$RNP = \frac{mp_i - mp_{wf}}{q} \quad (31)$$

where $mp_i$ is initial pseudo-pressure and $mp_{wf}$ is flowing pseudo-pressure.

The pseudo-pressure may be an analytical formulation dependent on the gas PVT properties, used to linearize the diffusivity equation by incorporating the pressure dependence of gas z-factor and viscosity, through the following integral evaluated to the pressure of interest.

$$mp = 2 \int_{p_{ref}}^{p} \frac{p}{\mu z} dp \quad (32)$$

where: mp is pseudo-pressure at pressure of interest, p is pressure, μ is gas viscosity, and z is a gas compressibility factor (z-factor).

A second modification to the liquid system methods may involve modifying the Perrine-Martin method. Instead of calculating a total equivalent liquid rate, for gas systems, gas may be assumed to be the reference phase dominating fluid flow. In certain embodiments, the calculation is done in two steps. First, a total equivalent gas rate may be determined through Equation (33), by incorporating the oil condensate as a gas pseudo-component in the gas rate. Second, a total equivalent downhole rate may be calculated through Equation (34), which combines gas and water flow.

$$q_{ge} = q_g \left(1 + 132800 \frac{\gamma_{o\_sg}}{M_o GOR}\right) \quad (33)$$

$$q_{te} = q_{ge} B_g + q_w B_w \quad (34)$$

where: $q_{te}$ is total equivalent downhole rate, $q_{ge}$ is equivalent gas rate, $q_g$ is gas rate, $y_{o\_sg}$ is oil specific gravity, $M_o$ is oil molecular weight, GOR is production gas-oil ratio (instantaneous ratio of gas rate/oil condensate rate), $q_w$ is water rate, $B_g$ is gas formation volume factor, and $B_w$ is the water formation volume factor.

In certain embodiments, this final rate may be used in Equation (31) to estimate rate-normalized pressure, Equation (4) to define material balance time, and finally, Equation (3) to determine the drainage volume. Also, the material balance expression may be reformulated to account for gas as the reference volume in the reservoir. The generalized material balance expression for gas is defined as in Equation (35).

(Gas expansion)+(Water expansion)+(Change in pore volume due to connate water/residual gas expansion and pore volume reduction)=(Underground withdrawal) (35)

The gas expansion term of Equation (35) may be defined as:

$$G(B_g - B_{gi}) \quad (36)$$

where: G is total gas volume originally in place, $B_g$ is gas formation volume factor at pressure of interest, and $B_{gi}$ is gas formation volume factor at initial reservoir pressure. The water expansion term of Equation (35) may be defined as:

$$W(B_w - B_{wi}) \quad (37)$$

where W is total water volume originally in place, $B_w$ is water formation volume factor at pressure of interest, and $B_{wi}$ is water formation volume factor at initial reservoir pressure.

The ratio ω may defined as the ratio between the original in-situ water and gas volumes, as defined in Equation (38), and may be approximated as shown in Equation (39).

$$\omega = \frac{WB_{wi}}{GB_{gi}} \quad (38)$$

$$\omega \approx \frac{(S_w - S_{wc})B_{wi}}{(1 - S_w - S_{gr})B_{gi}} \quad (39)$$

The change in pore volume due to the expansion of connate water and residual gas, and pore volume reduction, is derived as follows:

$$dPV = -dV_w - dV_g + dV_F = -(c_w V_w + c_g V_g + c_F V_F)\Delta p \quad (40)$$

where oil, water and pore volumes are defined as $$V_g = \frac{(GB_{gi} + WB_{wi})S_{wc}}{1 - S_{wc} - S_{gr}} \quad (41)$$

$$V_w = \frac{(GB_{gi} + WB_{wi})S_{gr}}{1 - S_{wc} - S_{gr}} \quad (42)$$

$$V_F = \frac{GB_{gi} + WB_{wi}}{1 - S_{wc} - S_{gr}} \quad (43)$$

By combining Equations (41), (42) and (43) into (40), we obtain:

$$-dPV = (GB_{gi} + WB_{wi})\left(\frac{S_{wc}c_w + S_{gr}c_g + c_F}{1 - S_{wc} - S_{gr}}\right)\Delta p \quad (44)$$

where: dPV is total change in pore volume, $dV_w$ is expansion in connate water volume, $dV_g$ is expansion in residual gas volume, $dV_F$ is reduction in pore volume due to formation compressibility, $S_{wc}$ is connate water saturation, and $S_{gr}$ is residual gas saturation. The underground withdrawal of Equation 35 may be calculated as follows.

$$G_p B_g + W_p B_w \quad (45)$$

where $G_p$ is cumulative gas production, $W_p$ is cumulative water production, $B_g$ is gas formation volume factor at pressure of interest, and $B_w$ is water formation volume factor at pressure of interest.

In certain embodiments, all terms in the generalized material balance expression may be solved either in terms of the reservoir pressure change, per Equation (46), or drainage volume, per Equation (47).

$$\Delta p = \left(\frac{1 - S_{wc} - S_{gr}}{S_{wc}c_w + S_{gr}c_g + c_F}\right) \quad (46)$$

$$\left\{\frac{G_p B_g + W_p B_w}{V_d} - \left(\frac{1}{1+\omega}\right)\left[\frac{(B_g - B_{gi})}{B_{gi}} + \frac{\omega(B_w - B_{wi})}{B_{wi}}\right]\right\}$$

$$V_d = \frac{G_p B_g + W_p B_w}{\frac{1}{(1+\omega)}\frac{(B_g - B_{gi})}{B_{gi}} + \left(\frac{\omega}{1+\omega}\right)\frac{(B_{wi} - B_{wi})}{B_{wi}} + \left(\frac{S_{wc}c_w + S_{gr}c_g + c_F}{1 - S_{wc} - S_{gr}}\right)\Delta p} \quad (47)$$

Equations (46) and (47) are valid for dry gas cases. In the presence of liquid condensate, the cumulative gas term ($G_p$) may be modified to account for the condensate production, similar to the correction done in Equation (33).

$$G_{pe} = G_p + 132800 \frac{y_{o\_sg}}{M_o} N_p \quad (48)$$

where $G_{pe}$ is gas equivalent cumulative production, $G_p$ is cumulative gas production, $N_p$ is cumulative oil (condensate) production, $y_{o\_sg}$ is oil (condensate) specific gravity, and $M_o$ is oil (condensate) molecular weight.

In certain embodiments, the gas formation volume factor of Equations (46) and (47) may be replaced by a two-phase formation volume factor which explicitly includes the impact of retrograde condensate on the gas properties. When the drainage volume and average reservoir pressure are determined for a gas system, a productivity index can be estimated using a gas-specific deliverability relationship (e.g., the c & n method), which forms the basis of subsequent production forecasting and IPR definition.

In certain embodiments, the methods of the present disclosure may be applied to unconventional fields and reservoirs with one or more wells, two or more wells, more than 10 wells, more than 100 wells, or more than 1,000 wells. In some embodiments, the methods of the present disclosure may be implemented through a surveillance and optimization program. In certain embodiments, the program may be automated. In certain embodiments, the methods of the present disclosure may apply to reservoirs including incompressible fluids, slightly compressible fluids (e.g., black oil), and/or variable compressibility fluids (e.g., volatile oil, gas condensate and dry gas). In certain embodiments, the methods of the present disclosure may be effective for wells with production at, above, or below saturation pressure.

In certain embodiments, the methods of the present disclosure may be used to derive value insights through one or more normalized well performance drivers. In certain embodiments, the methods of the present disclosure may use only routinely captured field data (e.g., surface well measurements) and may not require downhole or subterranean measurements. In some embodiments, the methods of the present disclosure may not include geometrical assumptions about the well or require reservoir properties which are difficult to capture for most wells. This may allow the models and methods of the present disclosure to be applied to a large number of wells, generating consistent performance metrics (e.g., PI, drainage volume and IRR) to characterize well performance at field scale. Multi-well trends in drainage volume, IRR and PI have been effectively used to quantify differences in completion effectiveness and reservoir quality. FIG. 9 shows the results of the methods of the present disclosure computed for a single sample well as compared to bottomhole pressure measured using a memory gauge, including IRR, drainage volume pressure, productivity index, and dynamic IPR. FIG. 9 demonstrates that the methods of the present disclosure provide an accurate estimation of the real data.

Figure 10A:
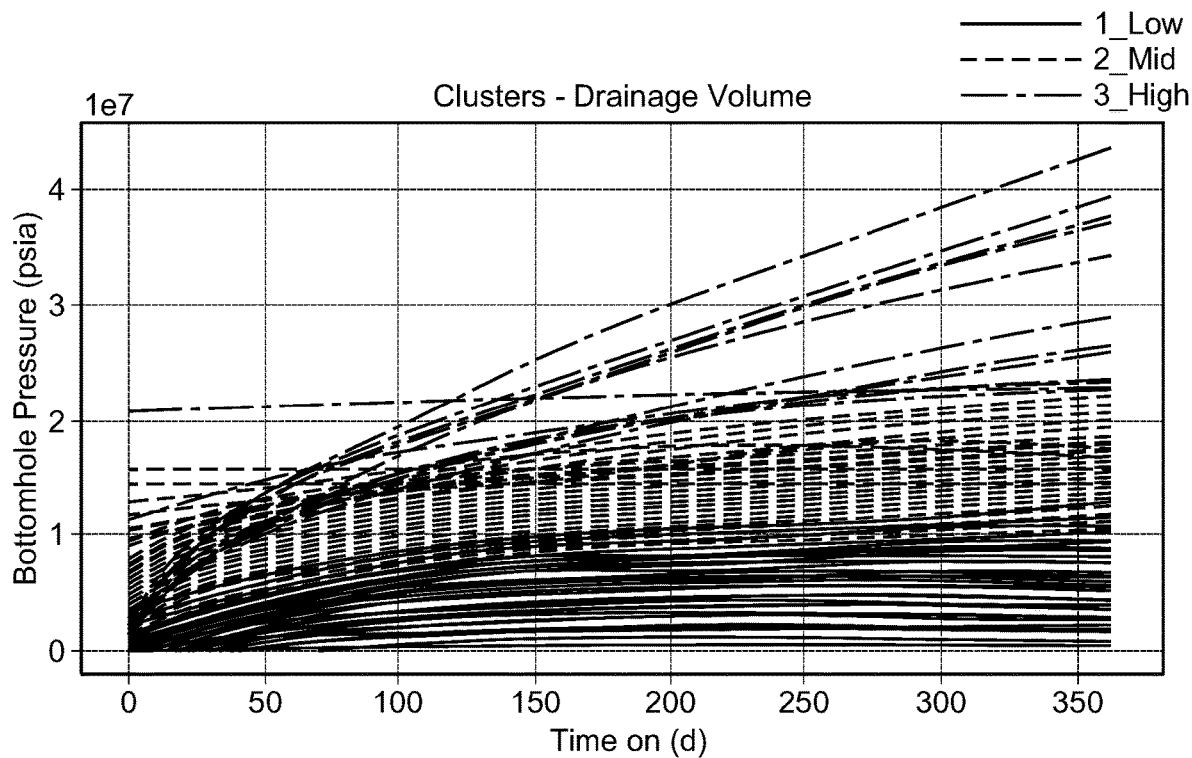
FIGS. 10A and 10B are plots of three drainage volume clusters for a field-wide data set according to certain embodiments of the present disclosure.
Figure 10B:
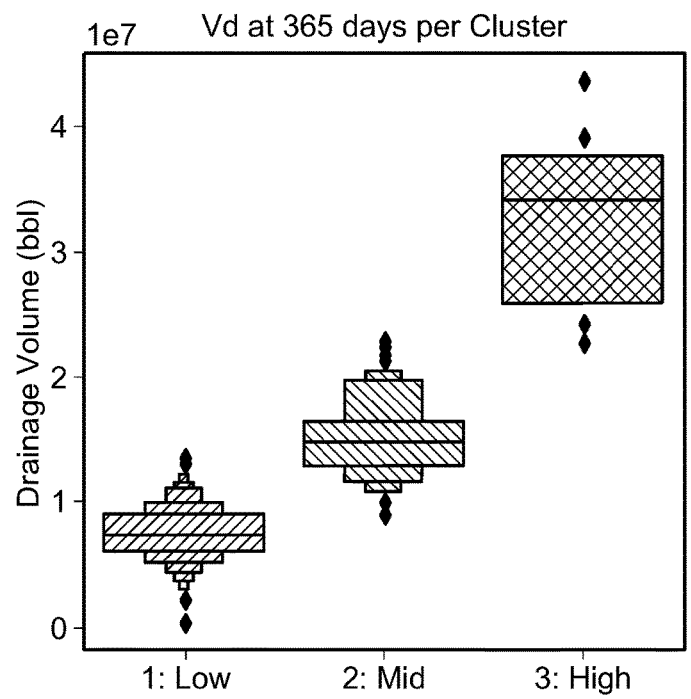
Figure 11A:
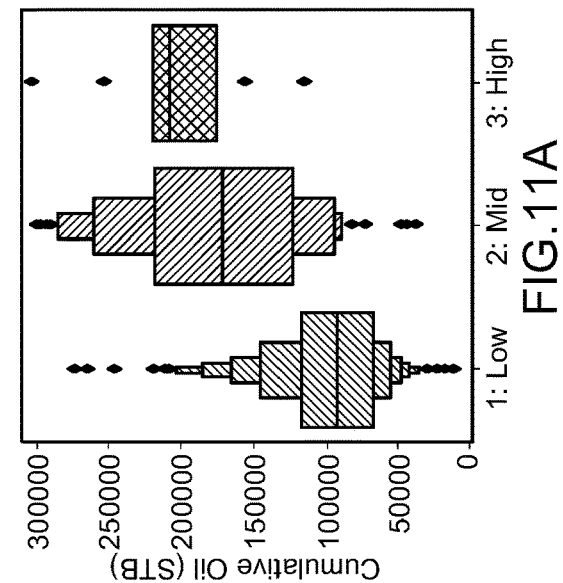
FIGS. 11A-F are plots illustrating performance drivers of the three drainages volume clusters of FIGS. 10A and 10B according to certain embodiments of the present disclosure.
Figure 11B:
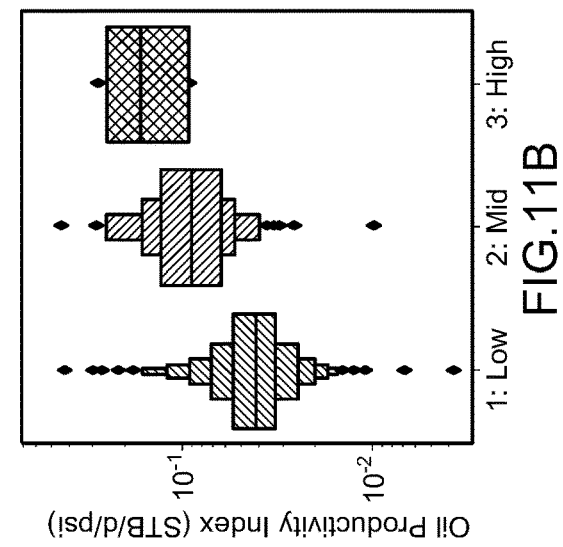
Figure 11C:
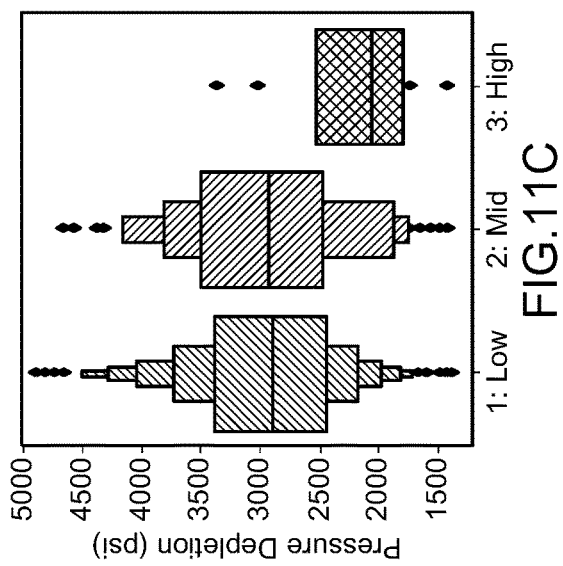
Figure 11D:
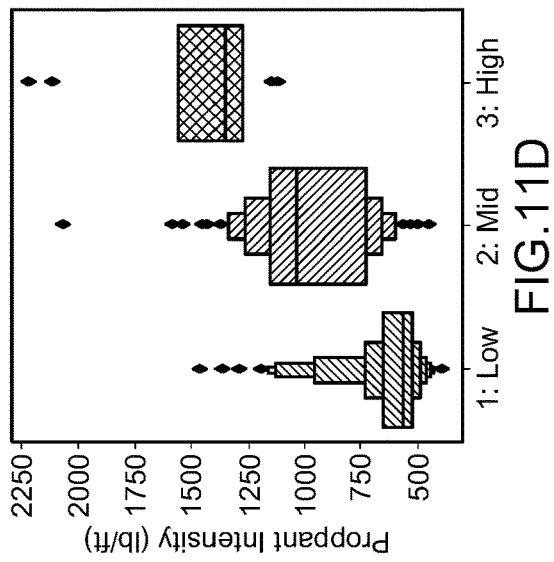
Figure 11E:
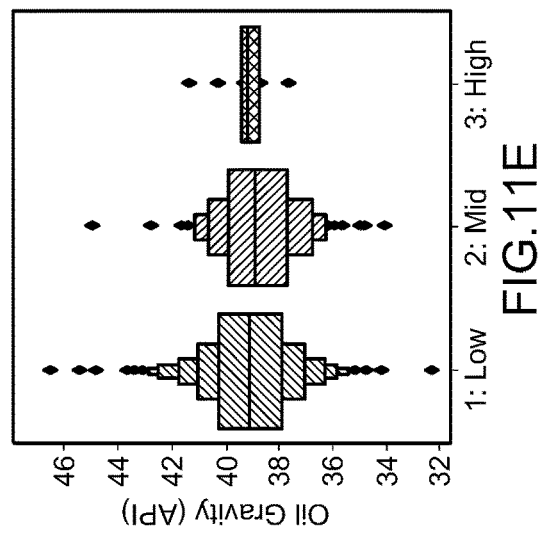
Figure 11F:
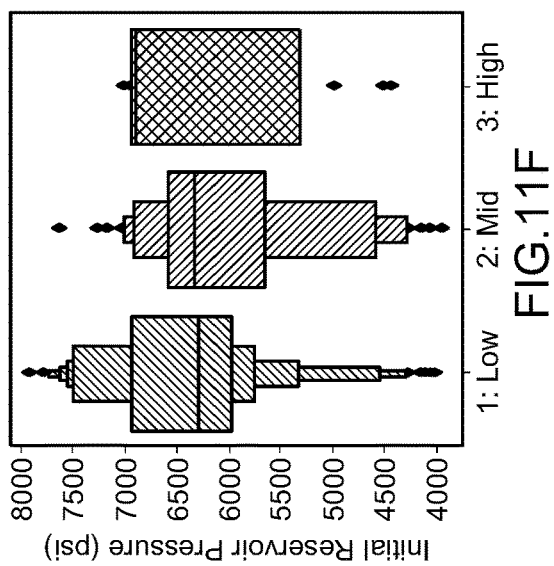

In some embodiments, the methods of the present disclosure may provide field-wide drainage volume and PI metrics that may be used in conjunction with data-driven unsupervised clustering techniques to find wells with similar characteristics. For example, FIGS. 10A and 10B show three drainage volume clusters for a sample dataset with about 600 wells in an unconventional field. Since drainage volume represents dynamic well response, such groupings can inform the key performance drivers describing well performance.

For example, in the case study shown in FIGS. 10A and 10B and FIGS. 11A-F, an increasing drainage volume is correlated with a higher productivity index. However, this does not always translate into a higher produced volume, as seen in cluster 3, which also experiences a smaller amount of pressure depletion. Wells with larger drainage volume might be constrained (e.g., choke management, surface offtake capacity limits, line back pressure etc.) and are potential candidates to increase production by systematically removing these constraints. Similarly, the drainage volume can be correlated with completion design (as evidenced with the strong correlation with proppant intensity). In this example, we do not notice any significant correlation with rock and fluid properties, such as initial reservoir pressure and oil gravity.

Figure 12:
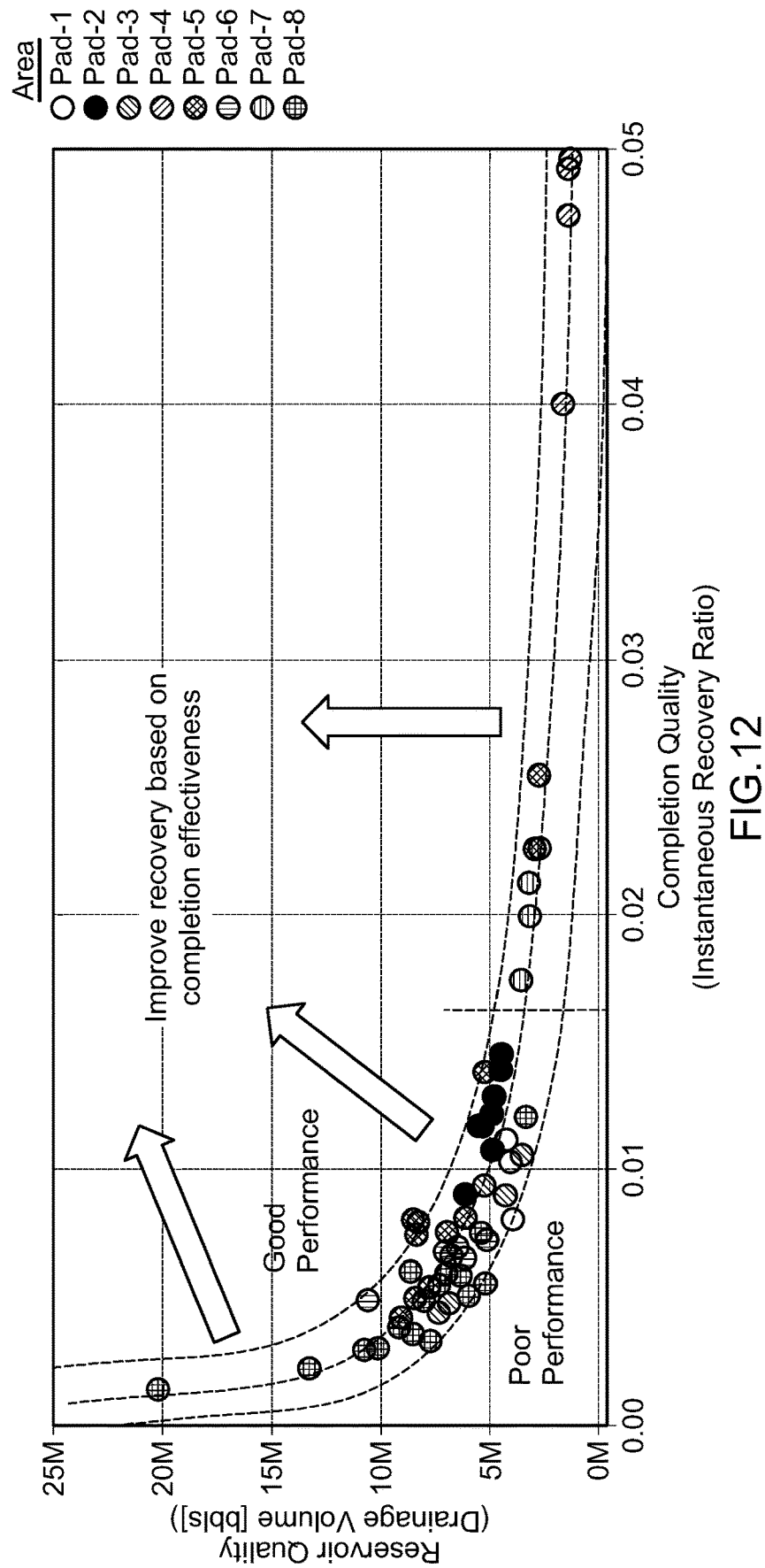
FIG. 12 is plot of drainage volume and instantaneous recovery ratio (IRR) for a series of pads of wells according to certain embodiments of the present disclosure.

In certain embodiments, the methods of the present disclosure may be used to determine one or more characteristics of a groups of wells (e.g., pads of wells). For example, the methods of the present disclosure may be used to effectively compare wells with different characteristics, including, but not limited to wells completed in different geologies, wells with different completion designs, and any combination thereof. In certain embodiments, the methods of the present disclosure may condense complex multidimensional trends into interpretable outputs, may highlight meaningful differences between wells, and may provide insights to inform the field development strategy (e.g., for undrilled inventory). For example, a multidimensional analysis can elucidate differences between reservoir quality and completion effectiveness, as shown in the case study of FIG. 12. In this case study, drainage volume was used as a proxy for reservoir quality, and IRR was used to represent the completion effectiveness. The desired outcome is a high contacted drainage volume with a high recovery efficiency; the curves in FIG. 12 represent an efficient frontier of improved performance. Plots like FIG. 12 can condense complex multidimensional trends into interpretable outputs, highlighting meaningful differences between wells and providing insights to inform the field development strategy for the undrilled inventory.

In certain embodiments, the methods of the present disclosure may provide data and outputs that may inform whether to develop a field including an unconventional reservoir. For example, the methods of the present disclosure may include determining whether to develop a field including an unconventional reservoir based, at least in part, on the PI and bottomhole pressure for the unconventional reservoir. In certain embodiments, one or more parameters or properties of a field development operation may be selected based, at least in part, on the PI and the bottomhole pressure. For example, parameters or properties of the field development operation may include, but are not limited to, number of wells to drill in the field, completion design, fracturing and completion fluid properties, artificial lift method and parameters thereof, and the like, and any combination thereof.

In certain embodiments, the methods of the present disclosure may allow for the identification of wells experiencing production interference from another part of the fluid system (e.g., another well) based, at least in part, on the productivity index for the reservoir, the well experiencing interference (i.e., the well being analyzed), and/or an interfering well. For example, well interference may occur when a new well completion (which may be referred to as a "child" well) impacts another existing nearby well's (which may be referred to as the "parent" well) production performance. In certain embodiments, when a well undergoes hydraulic fracturing, it may cause either direct interference (e.g., through fracture pathways) or indirect interference (e.g., through matrix pressurization) that could impact the production performance of nearby wells. In certain embodiments, nearby parent wells may be shut in when child wells are completed. In certain embodiments, interference may be determined by comparing production rate changes of parent wells before and after the child well completion. However, if the parent wells are operated under different operating conditions before and after the child well completion (e.g., a different drawdown strategy), making any conclusion on well interference may be difficult. Similarly, wellhead pressure in wells near the child well may also be monitored for inadvertent events, but pressure excursions in parent wells could be just transient and may not translate to any long term well production impact. In certain embodiments, PI changes in a parent well after one or more child well operations (e.g., hydraulic fracturing or other operations) may indicate interference with the production of the parent well. In certain embodiments, as compared to production rate and wellhead pressure, changes to PI may be more prominent, easier to detect, may normalize the surface operation, and/or may be more indicative of subsurface well production impact.

In certain embodiments, the methods and systems of the present disclosure may be used to evaluate pilot tests and field trials. When comparing various completion designs, pilot and control wells may not be produced with the same operating conditions, generating biases when the analysis is carried out purely with produced rates. In certain embodiments, the methods of the present disclosure may be used to effectively normalize the wells of a pilot study or field trial (e.g., using PI and drainage volume as key analysis variables) to determine their true reservoir potential and estimate the best economic design. For example, in certain embodiments, well data from two or more wells may be normalized based, at least in part, on the PI, tubing head pressure profiles, and choke changes for the two or more wells. In some embodiments, the well data may be normalized further one or more alternative or additional well parameters or properties (e.g., the fracturing fluids used to complete the well, the proppants used to complete the two or more wells, completion effectiveness, choke changes, tubing head pressure profiles, and the like).

In certain embodiments, the methods and system of the present disclosure may allow the evaluation of production optimization opportunities. For example, in certain embodiments, various bottomhole pressure scenarios may be generated to reflect different operational scenarios (for example, constrained facilities compared to unconstrained facilities, or conservative lift strategies compared to aggressive artificial lift strategies), and a PI-based forecast may be used to predict the expected production for each scenario and determine the most economically optimal case. For example, in certain embodiments, the methods of the present disclosure may include determining whether there is sufficient lift to produce fluid from a reservoir under current conditions. In certain embodiments, the methods of the present disclosure may further include determining whether one or more lift mechanisms (e.g., gas lift, suck-rod pumping, electrical submersible (ESP) pumping, reciprocating systems, jet hydraulic pumping systems, plunger lifts, progressive cavity pumps, and any combination thereof) would provide sufficient lift to induce or improve fluid production from a reservoir. The method may further include selecting a lift mechanism from the available lift mechanisms based on this determination. Determining whether sufficient lift exists under various conditions and determining which lift mechanism to select may be based, at least in part, on the productivity index and bottomhole pressure for the reservoir or one or more wells penetrating at least a portion of the reservoir. In some embodiments, one or more parameters for a lift operation may be selected based, at least in part, on the productivity index and bottomhole pressure for the reservoir or one or more wells penetrating at least a portion of the reservoir. Examples of parameters for a lift operation include, but are not limited to gas lift parameters, ESP pump parameters, rod pump parameters, and any combination thereof.

Figure 16:
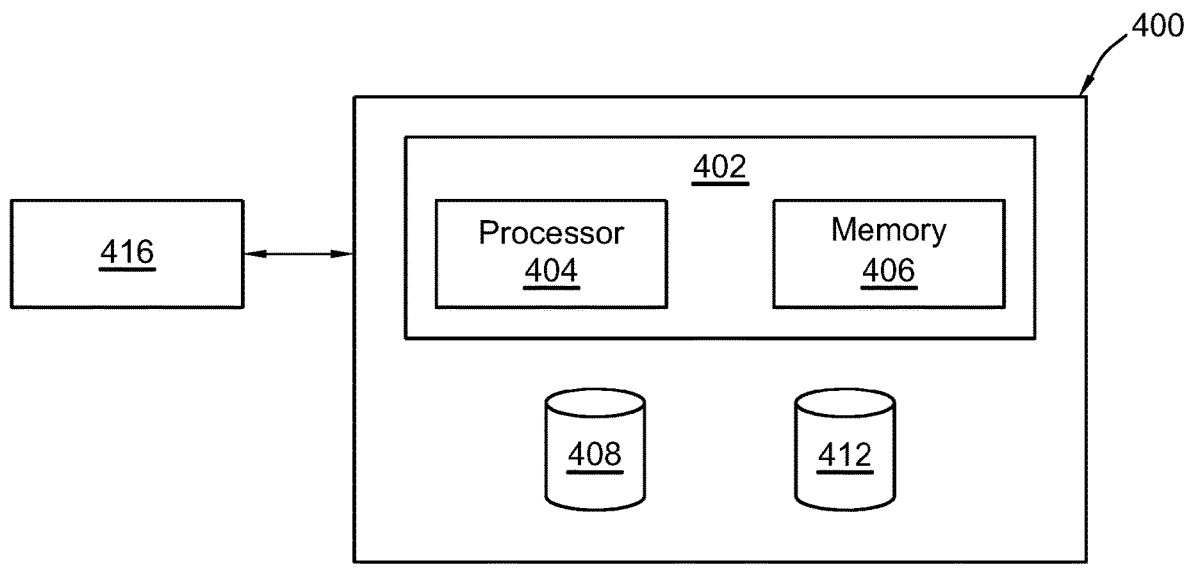
FIG. 16 is a block diagram showing an example information handling system in accordance with certain embodiments of the present disclosure.

FIG. 16 is a block diagram of an exemplary control unit 400 in accordance with some embodiments of the present disclosure. In certain example embodiments, control unit 400 may be configured to create and maintain a first database 408 that includes information concerning one or more fluid systems. In other embodiments the control unit 400 is configured to create and maintain databases 408 with information concerning one or more fluid systems. In certain example embodiments, control unit 400 is configured to use information from database 408 to train one or many machine learning algorithms 412, including, but not limited to, artificial neural network, random forest, gradient boosting, support vector machine, or kernel density estimator. In some embodiments, control system 402 may include one more processors, such as processor 404. Processor 404 may include, for example, a microprocessor, microcontroller, digital signal processor (DSP), application specific integrated circuit (ASIC), or any other digital or analog circuitry configured to interpret and/or execute program instructions and/or process data. In some embodiments, processor 404 may be communicatively coupled to memory 406. Processor 404 may be configured to interpret and/or execute non-transitory program instructions and/or data stored in memory 406. Program instructions or data may constitute portions of software for carrying out fluid system modeling, as described herein. Memory 406 may include any system, device, or apparatus configured to hold and/or house one or more memory modules; for example, memory 406 may include read-only memory, random access memory, solid state memory, or disk-based memory. Each memory module may include any system, device or apparatus configured to retain program instructions and/or data for a period of time (e.g., computer-readable non-transitory media).

Although control unit 400 is illustrated as including two databases, control unit 400 may contain any suitable number of databases and machine learning algorithms. Control unit 400 may be communicatively coupled to one or more displays 416 such that information processed by sensor control system 402 may be conveyed to operators at or near the pipeline or flowline or may be displayed at a location offsite.

Modifications, additions, or omissions may be made to FIG. 16 without departing from the scope of the present disclosure. For example, FIG. 16 shows a particular configuration of components for control unit 400. However, any suitable configurations of components may be used. For example, components of control unit 400 may be implemented either as physical or logical components. Furthermore, in some embodiments, functionality associated with components of control unit 400 may be implemented in special purpose circuits or components. In other embodiments, functionality associated with components of control unit 400 may be implemented in a general purpose circuit or components of a general purpose circuit. For example, components of control unit 400 may be implemented by computer program instructions. In particular, the methods of the present disclosure may be implemented by computer program instructions.

In certain embodiments, one or more steps of the methods of the present disclosure may be automated. In some embodiments, the entire workflow or method may be automated. In certain embodiments, one or more steps of the methods of the present disclosure may be continuously calculated in real-time based on measured data from one or more wells, from one or more pads of wells, or for an entire set of wells in a field or reservoir. In certain embodiments, the methods of the present disclosure may be automated and continuous, allowing an evergreen, automated assessment of well performance for all wells in a field.

To facilitate a better understanding of the present disclosure, the following examples of certain aspects of preferred embodiments are given. The following examples are not the only examples that could be given according to the present.

Example 1

Figure 13A:
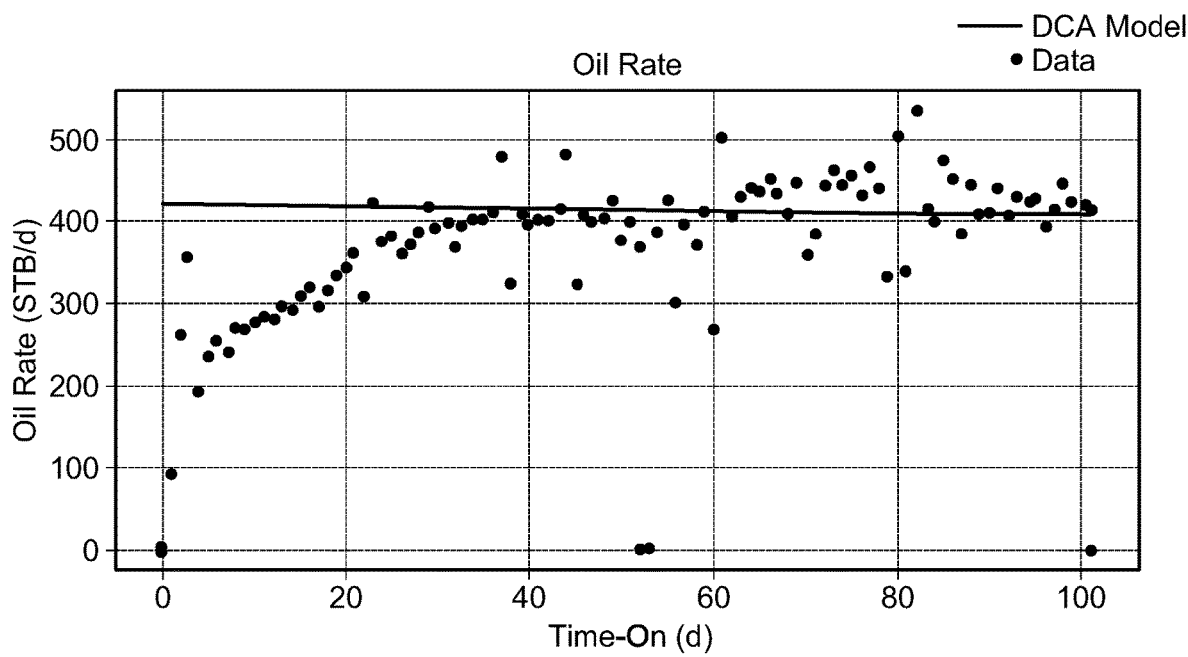
FIG. 13A-C are a set of forecasts compared to data from a single-well for both a conventional decline curve analysis (DCA) method and a productivity index-based forecasting (PIBF) method according to certain embodiments of the present disclosure.
Figure 13B:
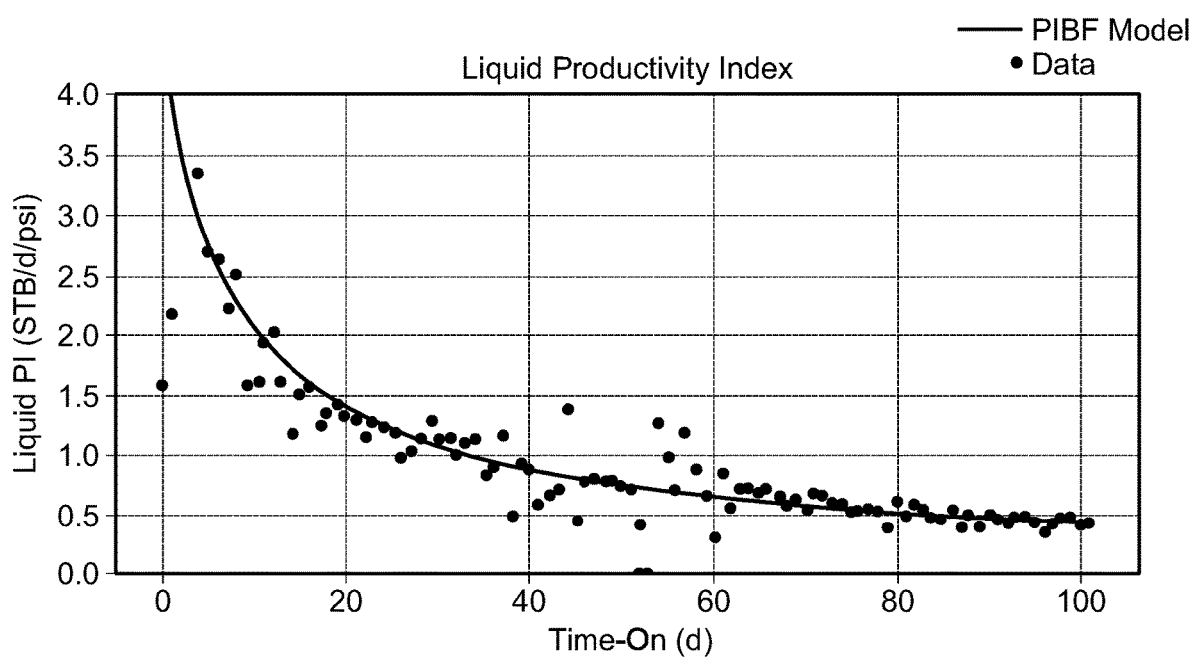
Figure 13C:
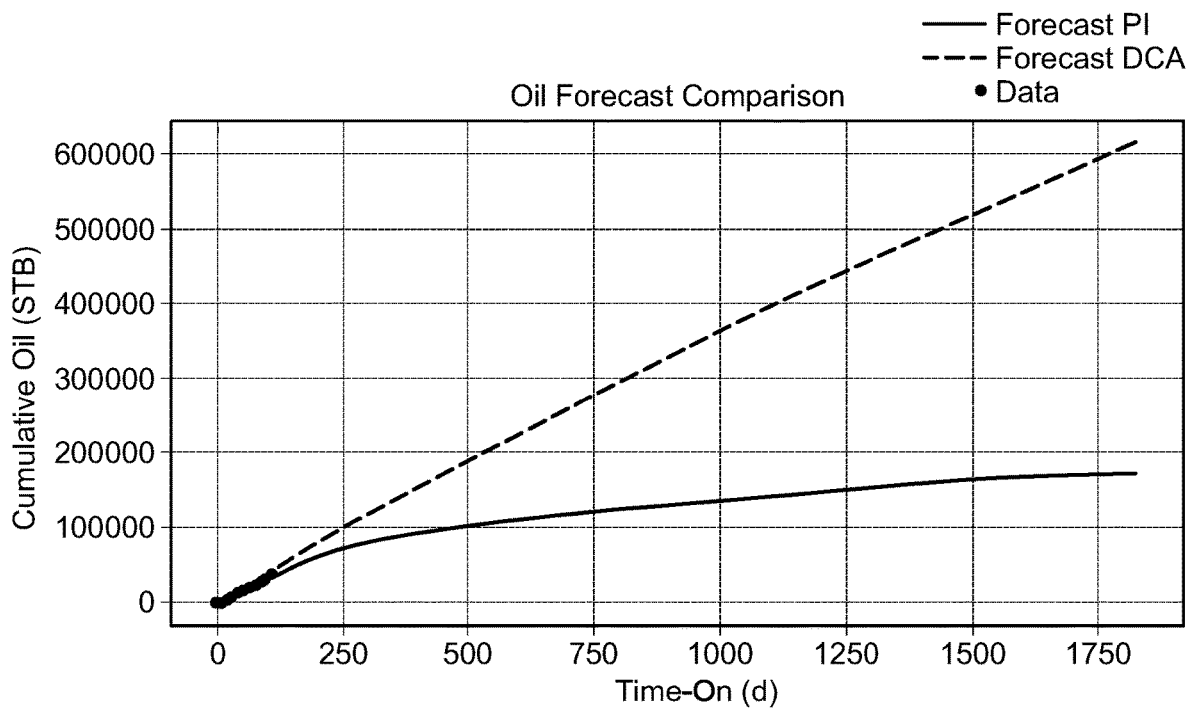

In this example, a hindcasting exercise was carried out in a major unconventional field with more than 1000 wells in order to validate the PI-based forecasting (PIBF) method against traditional decline curve analysis (DCA). FIGS. 13A-C are plots showing the forecasting results for a single well between DCA and PIBF methods. FIGS. 13A-C show that the PIBF method is able to better forecast production under severe constraints, as the well does not experience a clear rate decline trend.

Figure 14:
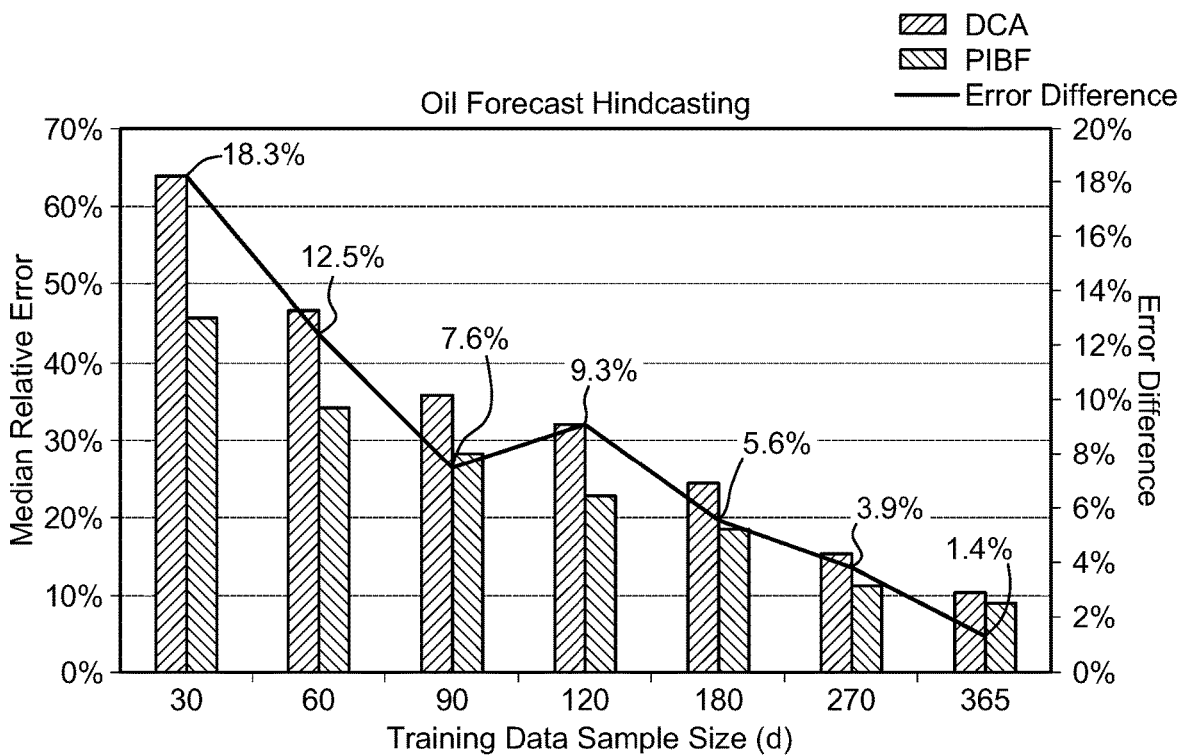
FIG. 14 is a graph showing median relative error versus training data sample size for both a conventional DCA method and a PIBF method according to certain embodiments of the present disclosure.
Figure 15A:
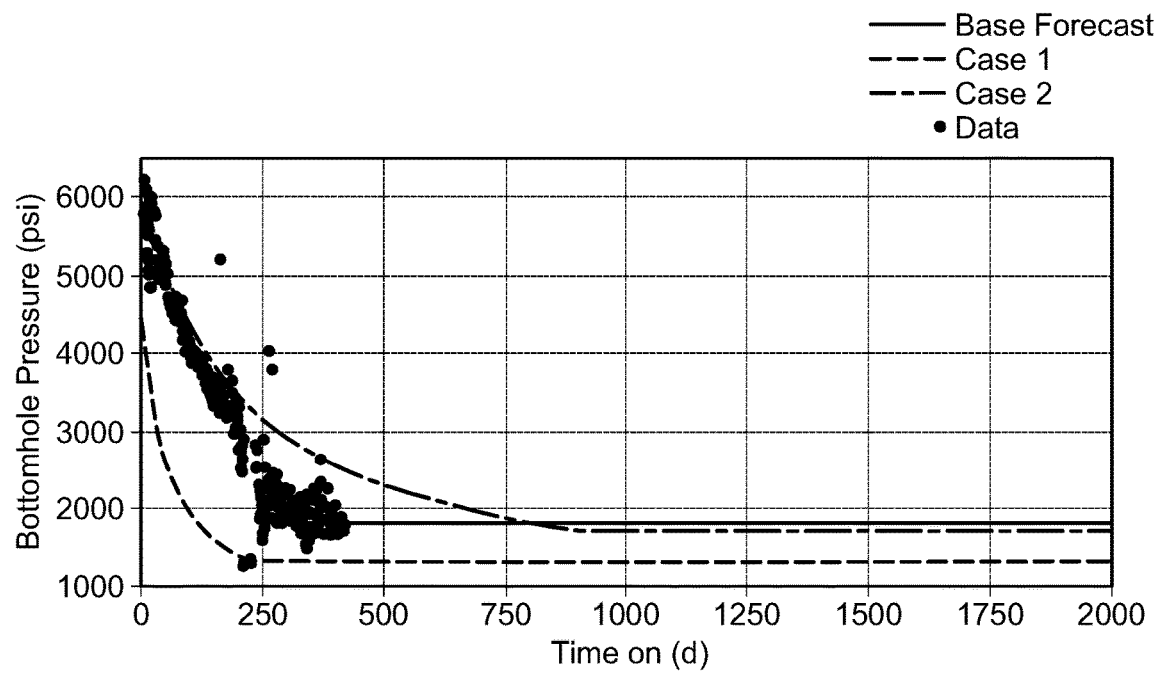
FIGS. 15A-D are a set of forecast sensitivity plots generated in accordance with certain embodiments of the present disclosure.
Figure 15B:
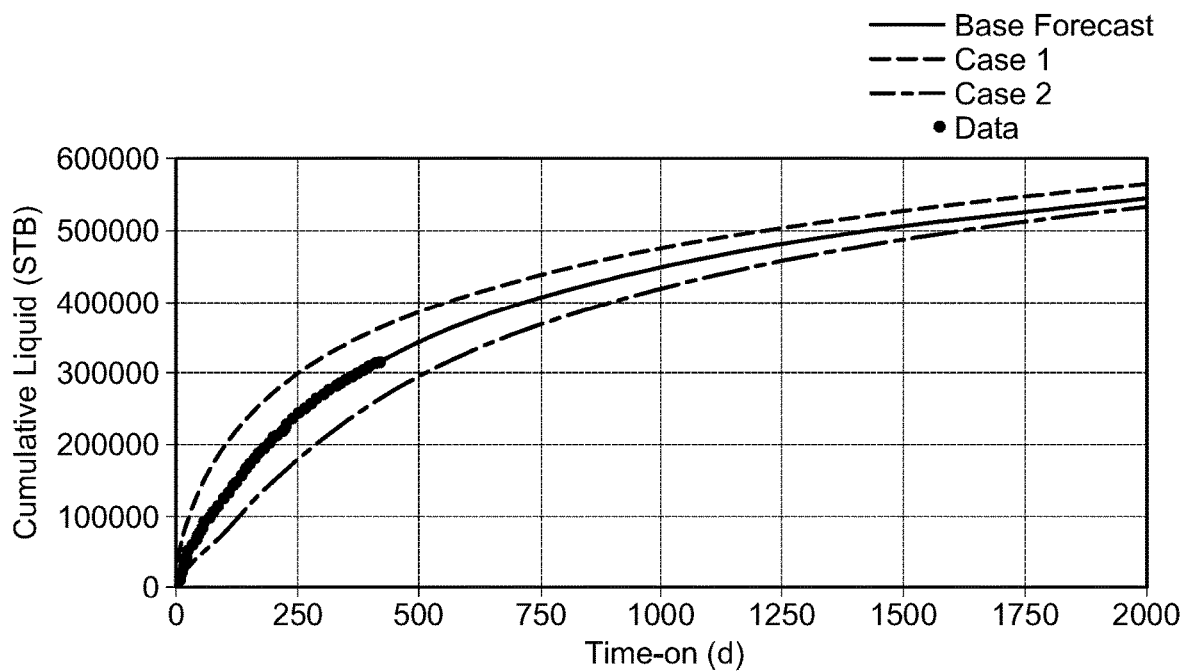
Figure 15C:
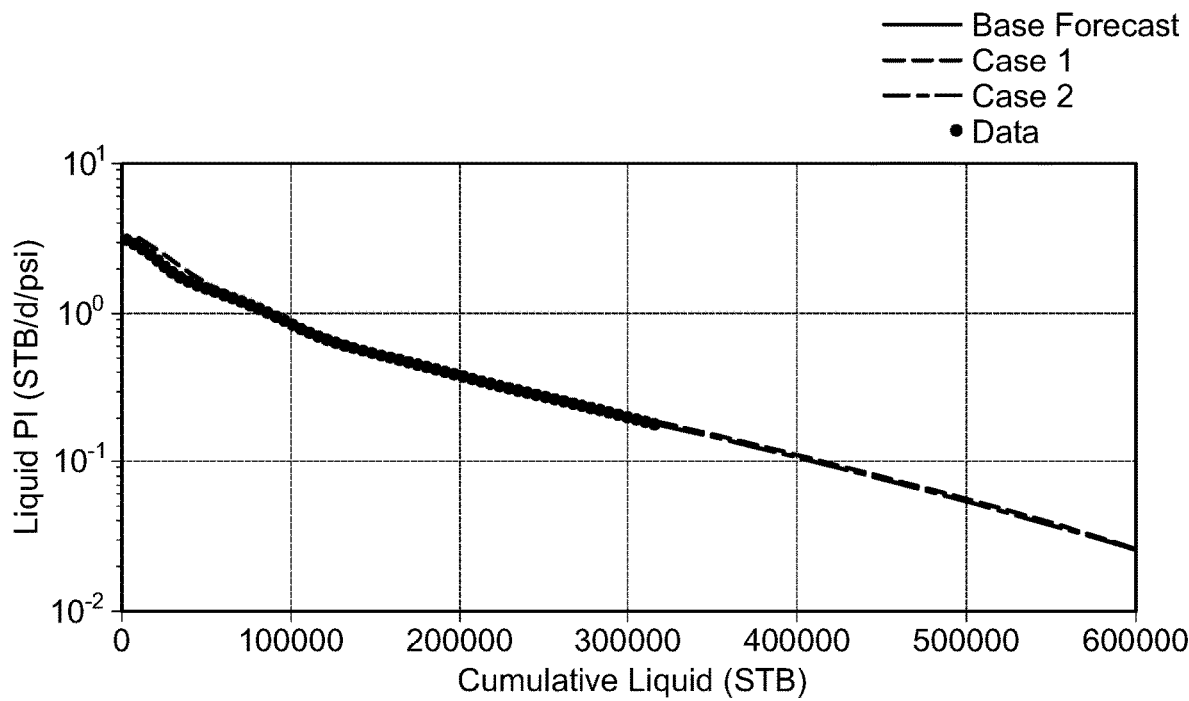
Figure 15D:
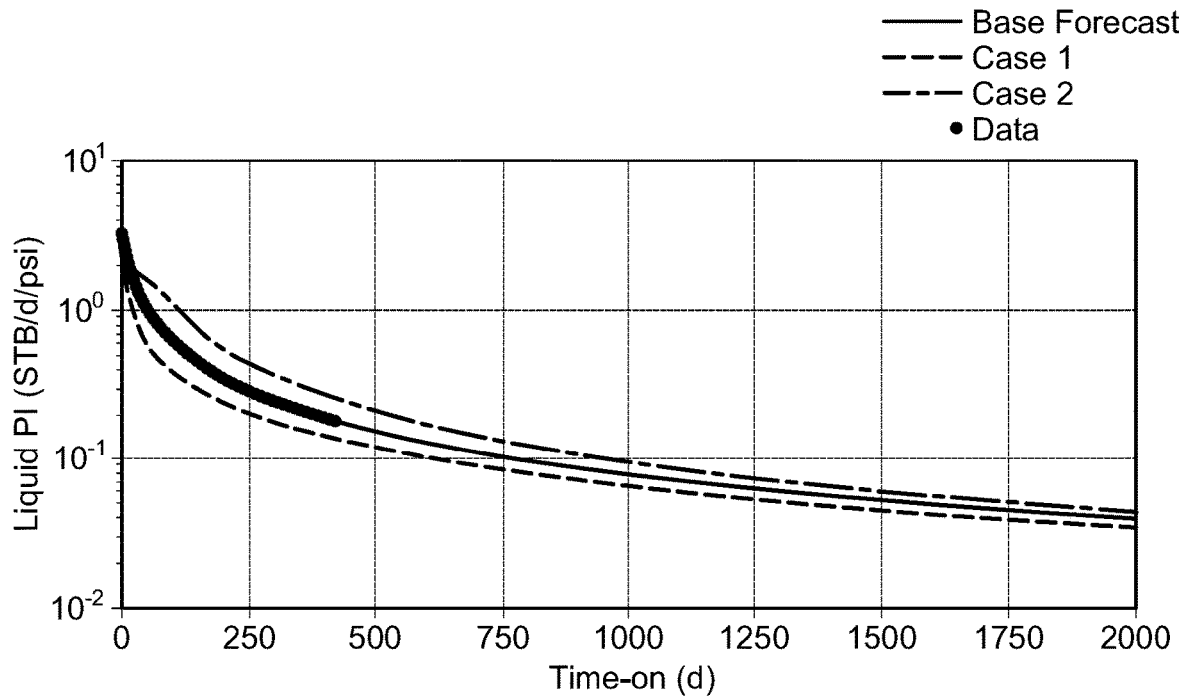

The field-wide results are shown in FIG. 14 for oil forecasting. Similar results were obtained for the gas and water phase forecast. In this example, each well was forecasted with various training data windows up to a full year (e.g., 30, 60, 90, days, etc.) using the remaining "known" data as a blind hold-out sample. In this example, only wells with large histories were included, to guarantee a representative validation dataset was available. As expected, for any forecasting model, the prediction errors can be very large when using a very limited dataset but systematically reduce as more training data is included. However, as shown in FIG. 14, the PIBF method performed better relative to DCA especially at early time, when production declines are yet not very well defined, achieving a median well-level error reduction from ~65% to ~45%. As more training data is included, the performance of both methods starts converging on similar outputs, as enough data is available to define a clear production decline trend. However, even with larger training data windows, an improved forecast accuracy is obtained through the PIBF method.

Wells can be severely constrained for several months, as shown in FIG. 5 and FIGS. 13A-C. In such cases, the DCA method cannot capture a meaningful decline trend, while the PI will decline as pressures drop, even when rates are held flat due to surface production constraints. This demonstrates that the PIBF method is more advantageous against rate-based methods, especially when significant production constraints are experienced.

Example 2

In this example, the methods of the present disclosure were used to evaluate the sensitivity of production to various bottomhole pressure profiles. A base forecast was generated using actual flowing conditions of a well, extrapolated with a constant bottomhole pressure profile. Two additional production sensitivity cases were evaluated. Case 1 generated a production profile assuming an aggressive pressure drawdown representing an unconstrained system with maximum pressure drawdown (for example, using an electric submersible pump). Case 2 considered a more conservative scenario with a moderate BHP profile. FIGS. 15A-D illustrate the production forecast sensitivities for the base forecast and two cases generated using PI-based forecasting methods of the present disclosure. FIGS. 15A-D show that by reducing the bottomhole pressure, there is a noticeable increase in oil production, especially at early time while still honoring material balance (since the profiles converge to similar ultimate recovery volumes at late time), which influences the well economics. This example demonstrates that the methods of the present disclosure are useful for sensitivity analysis, evaluating what-if scenarios, quantifying the production impact of various field constraints and artificial strategies, and computing the impact on economic value.

Figure 17:
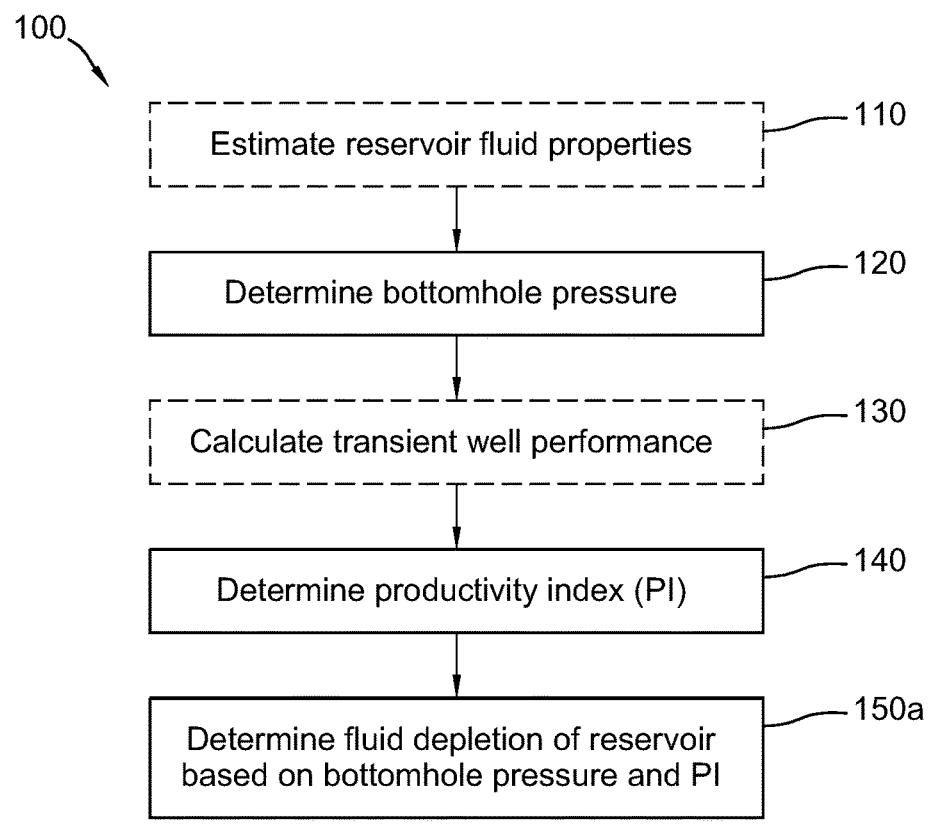

An embodiment of the present disclosure is a method of modeling fluid depletion from an unconventional reservoir including determining a bottomhole pressure for the unconventional reservoir based, at least in part, on a tubing head pressure for one or more wells penetrating at least a portion of the unconventional reservoir, one or more fluid properties of a fluid in the unconventional reservoir, and a well production volume for the one or more wells; determining a transient Productivity Index (PI) for the unconventional reservoir, based, at least in part, on the one or more fluid properties and measured well data for the one or more wells, wherein the measured well data comprises a well production rate and a well flowing pressure; and determining a fluid depletion of the unconventional reservoir based, at least in part, on the bottomhole pressure and the transient PI. FIG. 17 illustrates the process flow 100 from FIG. 1 including step 150a of determining fluid depletion of the reservoir based on bottomhole pressure and PI.

Another embodiment of the present disclosure is a method of modeling fluid depletion from an unconventional reservoir determining a bottomhole pressure for the unconventional reservoir based, at least in part, on a tubing head pressure for one or more wells penetrating at least a portion of the unconventional reservoir, one or more fluid properties of a fluid in the unconventional reservoir, and a well production volume for the one or more wells; determining a transient Productivity Index (PI) for the unconventional reservoir, based, at least in part on the one or more fluid properties and measured well data for the one or more wells, wherein the measured well data comprises one or more of a well production rate and a well flowing pressure; and determining, based, at least in part, on the transient productivity index and the bottomhole pressure, whether there is sufficient lift to produce fluid from the unconventional reservoir. FIG. 18 illustrates the process flow 100 from FIG. 1 including step 150b of evaluating whether there is sufficient lift to produce fluid from the unconventional reservoir based on the productivity index and the bottomhole pressure.

Another embodiment of the present disclosure is a method of modeling fluid depletion from an unconventional reservoir including, for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) for the unconventional reservoir, based, at least in part, on the one or more fluid properties and measured well data for the two or more wells, wherein the measured well data comprises one or more of a well production rate and a well flowing pressure; and normalizing the measured well data from the two or more wells based, at least in part, on fracturing fluids and proppants used to complete the two or more wells. FIG. 19 illustrates the process flow 100 from FIG. 1 including step 150c of normalizing well data based on fracturing fluids and proppants used to complete wells.

Another embodiment of the present disclosure is a method of modeling fluid depletion from an unconventional reservoir including, for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) for the unconventional reservoir, based, at least in part, on the one or more fluid properties and measured well data for the two or more wells, wherein the measured well data comprises one or more of a well production rate and a well flowing pressure; and identifying at least one well of the two or more wells experiencing production interference from another well based, at least in part, on the PI. FIG. 20 illustrates the process flow 100 from FIG. 1 including step 150d of identifying wells experiencing production interference based on the PI.

Another embodiment of the present disclosure is a method of modeling fluid depletion from an unconventional reservoir including, for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) for the unconventional reservoir; and determining whether to develop a field comprising the unconventional reservoir based, at least in part, on the PI and the bottomhole pressure. FIG. 21 illustrates the process flow 100 from FIG. 1 including step 150e of determining whether to develop a field including the reservoir based on PI and bottomhole pressure.

Another embodiment of the present disclosure is a method of modeling fluid depletion from an unconventional reservoir including, for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) for the unconventional reservoir; and normalizing well data from the two or more wells based, at least in part, on the PI, the tubing head pressure, and choke changes for the two or more wells. FIG. 22 illustrates the process flow 100 from FIG. 1 including step 150f of normalizing well data based on PI, tubing head pressure profiles, and choke changes.

Another embodiment of the present disclosure is a method of modeling fluid depletion from an unconventional reservoir including, for two or more wells penetrating at least a portion of the unconventional reservoir, determining a bottomhole pressure for the unconventional reservoir based on a tubing head pressure of the two or more wells, one or more fluid properties of a fluid in the unconventional reservoir, and a well production volume for the two or more wells; determining a Productivity Index (PI) and a pressure depletion for the unconventional reservoir; and calculating a well inflow performance for the reservoir based, at least in part, on the PI, the pressure depletion, and the bottomhole pressure. FIG. 23 illustrates the process flow 100 from FIG. 1 including step 150g of calculating a well inflow performance for the reservoir based, at least in part, on the PI, pressure depletion and bottomhole pressure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method of modeling fluid depletion from an unconventional reservoir, comprising:
   measuring, via two or more gauges, a tubing head pressure of two or more wells penetrating at least a portion of the unconventional reservoir;
   for the two or more wells, determining a bottomhole pressure for the unconventional reservoir based on the tubing head pressure of the two or more wells, one or more fluid properties of a fluid in the unconventional reservoir, and a well production volume for the two or more wells;
   for the two or more wells, determining a drainage volume and a reservoir pressure depletion based, at least in part, on the bottomhole pressure for the unconventional reservoir;
   for the two or more wells, determining, using an optimization routine, a transient well performance for the unconventional reservoir based, at least in part, on the drainage volume and the reservoir pressure depletion;
   determining a Productivity Index (PI) for the unconventional reservoir, based, at least in part, on the transient well performance, the one or more fluid properties and measured well data for the two or more wells, wherein the measured well data comprises one or more of a well production rate and a well flowing pressure; and
   identifying at least one well of the two or more wells experiencing production interference from another well based, at least in part, on the PI.

2. The method of claim 1, further comprising estimating the one or more fluid properties of the fluid based, at least in part, on a PVT model or correlation.

3. The method of claim 1, wherein determining the fluid depletion comprises determining natural gas depletion of the unconventional reservoir.

4. The method of claim 1, further comprising determining an instantaneous recovery ratio for the two or more wells.

5. A method of modeling fluid depletion from an unconventional reservoir, comprising:
   measuring, via two or more gauges, a tubing head pressure of two or more wells penetrating at least a portion of the unconventional reservoir;
   for the two or more wells, determining a bottomhole pressure for the unconventional reservoir based on the tubing head pressure of the two or more wells, one or more fluid properties of a fluid in the unconventional reservoir, and a well production volume for the two or more wells;
   for the two or more wells, determining a drainage volume and a reservoir pressure depletion based, at least in part, on the bottomhole pressure for the unconventional reservoir;
   for the two or more wells, determining, using an optimization routine, a transient well performance for the unconventional reservoir based, at least in part, on the drainage volume and reservoir pressure depletion;
   determining a Productivity Index (PI) for the unconventional reservoir, based, at least in part, on the transient well performance for the two or more wells; and
   determining whether to develop a field comprising the unconventional reservoir based, at least in part, on the PI and the bottomhole pressure.

6. The method of claim 5, further comprising selecting one or more parameters or properties of a field development operation based, at least in part, on the PI and the bottomhole pressure.

\* \* \* \* \*